(12) United States Patent
Kadokawa et al.

(10) Patent No.: US 8,414,433 B2
(45) Date of Patent: Apr. 9, 2013

(54) CONTINUOUSLY VARIABLE TRANSMISSION

(75) Inventors: Masanori Kadokawa, Toyota (JP); Daisuke Kikukawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 515 days.

(21) Appl. No.: 12/616,860

(22) Filed: Nov. 12, 2009

(65) Prior Publication Data

US 2010/0120562 A1    May 13, 2010

(30) Foreign Application Priority Data

Nov. 13, 2008    (JP) ................................. 2008-290920

(51) Int. Cl.
*F16H 61/00* (2006.01)
*F16H 63/00* (2006.01)
*F16H 9/18* (2006.01)
*F16H 55/56* (2006.01)

(52) U.S. Cl.
USPC ............................................. 474/28; 474/18

(58) Field of Classification Search ............... 474/18, 474/28
See application file for complete search history.

(56) References Cited

U.S. PATENT DOCUMENTS

| | | | | |
|---|---|---|---|---|
| 4,464,145 A | * | 8/1984 | Kawamoto et al. | 474/28 |
| 4,753,627 A | * | 6/1988 | Kawamoto | 474/18 |
| 4,767,384 A | * | 8/1988 | Moan | 474/28 |
| 5,180,339 A | * | 1/1993 | Haley et al. | 474/28 |
| 5,439,419 A | * | 8/1995 | Yamada et al. | 474/18 |
| 5,803,846 A | * | 9/1998 | Yamada et al. | 474/18 |
| 5,941,787 A | * | 8/1999 | Imaida et al. | 474/18 |
| 6,089,999 A | * | 7/2000 | Imaida et al. | 474/18 |
| 2002/0160867 A1 | * | 10/2002 | Katou | 474/28 |
| 2003/0232675 A1 | * | 12/2003 | Miyazaki et al. | 474/18 |
| 2005/0197221 A1 | * | 9/2005 | Nozawa et al. | 474/18 |
| 2006/0009321 A1 | * | 1/2006 | Carlson et al. | 474/18 |

FOREIGN PATENT DOCUMENTS

| | | |
|---|---|---|
| JP | 6280063 | 5/1987 |
| JP | 64020542 U | 2/1989 |
| JP | 01093657 A | 4/1989 |
| JP | 02022425 U | 2/1990 |
| JP | 02062450 A | 3/1990 |
| JP | 02138259 U | 11/1990 |
| JP | 03069739 | 7/1991 |
| JP | 07217715 A | 8/1995 |
| JP | 2002327814 A | 11/2002 |
| JP | 2003227552 A | 8/2003 |
| JP | 2005249132 A | 9/2005 |
| JP | 2008223903 A | 9/2008 |

* cited by examiner

*Primary Examiner* — Michael Mansen
*Assistant Examiner* — Henry Liu
(74) *Attorney, Agent, or Firm* — Gifford, Krass, Sprinkle, Anderson & Citkowski, P.C.

(57) ABSTRACT

A continuously variable transmission is provided with i) a primary pulley that is formed by a driving-side fixed sheave that is fixed to a drive shaft, a driving-side movable sheave, and a driving-side cylinder member, and has a driving-side cylinder, ii) a secondary pulley that is formed by a driven-side fixed sheave that is fixed to a driven shaft, a driven-side movable sheave, and a driven-side cylinder member, and has a driven-side cylinder, and iii) a drive belt. The drive shaft has a drive shaft internal fluid passage for supplying hydraulic fluid to the driving-side cylinder. A driving-side communicating fluid passage that communicates the drive shaft internal fluid passage with the driving-side cylinder is formed between the driving-side cylinder member and the driving-side movable sheave.

2 Claims, 19 Drawing Sheets

F I G . 13
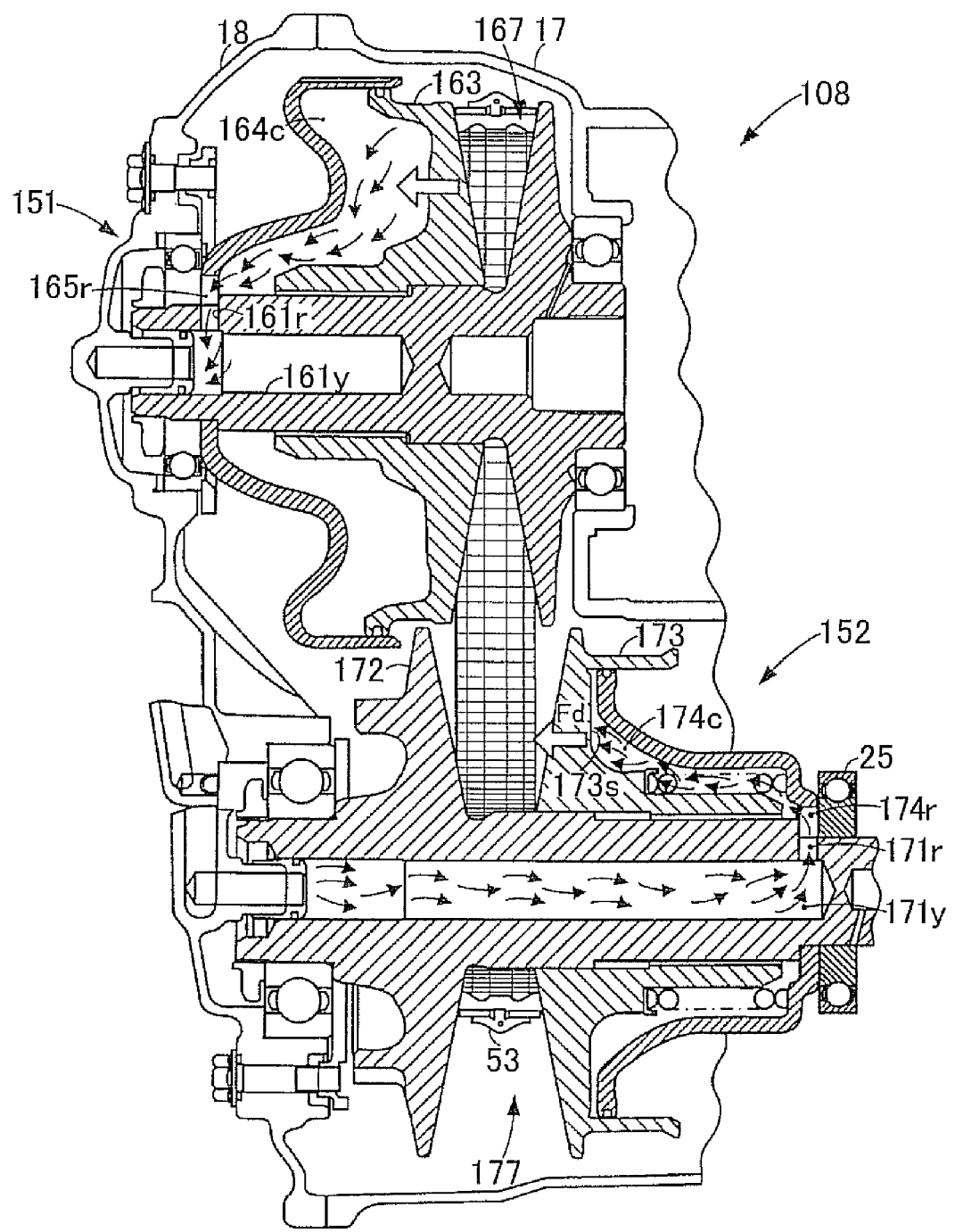

CONTINUOUSLY VARIABLE TRANSMISSION

INCORPORATION BY REFERENCE

The disclosure of Japanese Patent Application No. 2008-290920 filed on Nov. 13, 2008 including the specification, drawings and abstract is incorporated herein by reference in its entirety.

BACKGROUND OF THE INVENTION

1. Field of the Invention

The invention relates to a continuously variable transmission that changes speed ratios continuously (i.e., in a non-stepped manner). More particularly, the invention relates to a continuously variable transmission that is provided with a primary pulley and a secondary pulley that are hydraulically operated, and a drive belt that is wound around those pulleys and transmits power.

2. Description of the Related Art

Japanese Patent Application Publication No. 2005-249132 (JP-A-2005-249132) describes one related continuously variable transmission that is provided with a primary pulley, a secondary pulley, and a drive belt. The primary pulley is formed of a driving-side fixed sheave that is fixed to a drive shaft, a driving-side movable sheave that is provided on the drive shaft so as to be able to move in the axial direction, and a driving-side cylinder member that defines a driving-side cylinder to which hydraulic fluid is supplied. The secondary pulley is formed of a driven-side fixed sheave that is fixed to a driven shaft, a driven-side movable sheave that is provided on the driven shaft so as to be able to move in the axial direction, and a driven-side cylinder member that defines a driven-side cylinder to which hydraulic fluid is supplied.

In this continuously variable transmission, the driving-side cylinder member includes a partition wall member that is fixed to the drive shaft and divides the driving-side cylinder into a sheave-side cylinder that is defined by a driving-side movable sheave and a member-side air cylinder that is defined by the driving-side cylinder member. The driving-side cylinder member also includes a pressing member that divides the member-side cylinder into a member-side hydraulic cylinder that is defined by the driving-side cylinder member and a member-side air cylinder that is defined by the partition wall member inside the member-side cylinder. This pressing member is supported by the partition wall member and the driving-side cylinder member so as to be able to move in the axial direction, and pushes the driving-side movable sheave in the axial direction using the hydraulic pressure inside the member-side hydraulic cylinder.

Further, the drive shaft has a first drive shaft internal fluid passage that is open at the outer peripheral surface of the drive shaft to supply hydraulic fluid to the driving-side cylinder, and a second drive shaft internal fluid passage formed away from the first drive shaft internal fluid passage in the axial direction. The driving-side movable sheave has a sheave internal fluid passage that communicates the first drive shaft internal fluid passage with the driving-side cylinder. The partition wall member has a partition wall internal fluid passage that communicates the driving side cylinder with the member side hydraulic cylinder. According to this structure, when the driving-side movable sheave is moved away from the driving-side fixed sheave, hydraulic fluid is supplied from the first drive shaft internal fluid passage of the drive shaft into the driving-side cylinder through the sheave internal fluid passage, and then supplied from the driving-side cylinder into the member-side hydraulic cylinder through the partition wall internal fluid passage.

Meanwhile, when the driving-side movable sheave is moved toward the driving-side fixed sheave, hydraulic fluid is supplied from the second drive shaft internal fluid passage of the drive shaft directly into the driving-side cylinder, and then from the driving-side cylinder into the member-side hydraulic cylinder through the partition wall internal fluid passage. In this continuously variable transmission, providing a so-called double piston structure that moves the driving-side movable sheave using the hydraulic pressure inside the driving-side cylinder and the hydraulic pressure inside the member-side hydraulic cylinder increases the pressure on the driving-side movable sheave, which increases the squeezing force on the drive belt from the driving-side movable sheave and the driving-side fixed sheave, and thus increases the power that is transmitted.

However, in this related continuously variable transmission, the sheave internal fluid passage that communicates the first drive shaft internal fluid passage formed in the drive shaft with the driving side-cylinder is formed in the driving-side movable sheave. This driving-side movable sheave has an inner cylinder portion that slides along the outer peripheral surface of a primary shaft that serves as the drive shaft, a radially extending portion that continues from the end portion of the driving-side fixed sheave of that inner cylinder portion and extends toward the outer peripheral side, and an outer cylinder portion that continues on from the outer peripheral end of this radially extending portion and extends axially in the same direction as the inner cylinder portion, just as described in JP-A-2005-249132.

Therefore, when forming the sheave internal fluid passage in the radially extending portion, a drilling tool is set angled toward the radially extending portion from between the inner cylinder portion and the outer cylinder portion, and the sheave internal fluid passage is machined through the inner peripheral surface of the driving-side movable sheave at an angle from the surface of the radially extending portion, so the drilling process is a lot of work. Also, the drilling process produces burrs on the inner peripheral side of the through-hole, and the process to remove these burrs is troublesome.

Moreover, an annular notch is formed in the outer peripheral surface of the primary shaft in order to reliably communicate the angled sheave internal fluid passage with the first drive shaft internal fluid passage formed in the drive shaft. Therefore, both the process of forming this annular notch and the process of removing the burrs take time and effort. In addition, the partition wall internal fluid passage that communicates the driving-side cylinder with the member-side hydraulic cylinder is formed in a corner portion of the partition wall member, and the processes of drilling the hole and removing the burrs also take time and effort. As a result, the number of processes for forming the fluid passages that supply hydraulic fluid increases, so the production efficiency decreases.

SUMMARY OF THE INVENTION

In view of these problems, the invention provides a continuously variable transmission that enables production efficiency to be improved by forming a fluid passage that communicates a cylinder to which hydraulic fluid is supplied with a fluid passage formed in a drive shaft with a simple structure, and thus reducing the trouble of forming the fluid passage.

Therefore, a first aspect of the invention relates to a continuously variable transmission provided with a primary pulley, a secondary pulley, and a drive belt. The primary pulley includes a driving-side fixed sheave that is fixed to a drive shaft, a driving-side movable sheave that faces the driving-side fixed sheave in the axial direction and is provided on the drive shaft so as to be able to move in the axial direction, and a driving-side cylinder member that covers the side surface of the driving-side movable sheave on the side opposite the side of the driving-side fixed sheave, is fixed to the drive shaft, and defines a driving-side cylinder to which hydraulic fluid is supplied. The secondary pulley includes a driven-side fixed sheave that is fixed to a driven shaft that is parallel to the drive shaft, a driven-side movable sheave that faces the driven-side fixed sheave in the axial direction and is provided on the driven shaft so as to be able to move in the axial direction, and driven-side cylinder member that covers the side surface of the driven-side movable sheave on the side opposite the side of the driven-side fixed sheave, is fixed to the driven shaft, and defines a driven-side cylinder to which hydraulic fluid is supplied. The drive belt is wound around the primary pulley and the secondary pulley. The drive shaft has a drive shaft internal fluid passage that opens at the outer peripheral surface of the drive shaft to supply hydraulic fluid into the driving-side cylinder, and a driving-side communicating fluid passage that communicates the drive shaft internal fluid passage with the driving-side cylinder is formed in the driving-side cylinder member.

According to this structure, hydraulic fluid supplied into the drive shaft internal fluid passage is supplied to the sheave-side cylinder and the member-side hydraulic cylinder through the driving-side communicating fluid passage. Therefore, the structure is simpler than that of the related continuously variable transmission. That is, in the related continuously variable transmission, the fluid passage extending at an angle from the outer periphery toward the inner periphery of the inner cylinder portion is formed using a drilling tool from between the inner cylinder portion and the outer cylinder portion of the driving-side movable sheave. However, in the continuously variable transmission according to the invention, it is not necessary to form this kind of fluid passage. Also, the driving-side communicating fluid passage for supplying hydraulic fluid to the sheave-side cylinder and the member-side hydraulic cylinder is formed in the driving-side cylinder member, and thus is a simple structure that is communicated with the drive shaft internal fluid passage.

Also, this continuously variable transmission improves production efficiency by reducing the trouble that it takes to form the fluid passage compared with the related continuously variable transmission. That is, in the related continuously variable transmission, the drilling tool is set between the inner cylinder portion and the outer cylinder portion of the driving-side movable sheave and the fluid passage is formed at an angle from the outer periphery of the inner cylinder portion toward the inner periphery of the inner cylinder portion. However, in the continuously variable transmission according to the invention, it is not necessary to form this kind of fluid passage, so forming the fluid passage is less troublesome.

Further, the driving-side communicating fluid passage can be formed in the driving-side cylinder member at the same time the through-hole is formed in the driving-side cylinder member, in a single press-forming process using a hole-making machine such as a punch press. In addition, burrs formed in the through-hole and the driving-side communicating fluid passage can be removed at the same time in a single process. As a result, no special forming process is needed to form the driving-side communicating fluid passage, so forming the fluid passage is less troublesome.

Also, removing the burrs from deep inside the drive shaft internal fluid passage where they are hard to reach, which is where they form in the related art, is troublesome. However, in the continuously variable transmission according to the invention, burrs in the driving-side communicating passage are exposed to the outside and therefore can be easily removed, which makes forming the fluid passage less troublesome.

Also, the driven shaft may have a driven shaft internal fluid passage that opens at the outer peripheral surface of the driven shaft to supply hydraulic fluid into the driven-side cylinder, and a driven-side communicating fluid passage that communicates the driven shaft internal fluid passage with the driven-side cylinder may be formed in the driven-side cylinder member.

According to this structure, hydraulic fluid supplied into the driven shaft internal fluid passage is supplied to the driven-side cylinder through the driven-side communicating fluid passage. Therefore, the structure is simpler than that of the related continuously variable transmission. That is, in the related continuously variable transmission, the fluid passage extending at an angle from the outer periphery toward the inner periphery of the inner cylinder portion is formed using a drilling tool from between the inner cylinder portion and the outer cylinder portion of the driving-side movable sheave. However, in the continuously variable transmission according to the invention, it is not necessary to form this kind of fluid passage. Also, the driven-side communicating fluid passage for supplying hydraulic fluid to the driven-side cylinder is formed in the driven-side cylinder member, and thus is formed by a simple structure that is communicated with the driven shaft internal fluid passage.

Also, this continuously variable transmission improves production efficiency by reducing the trouble that it takes to form the fluid passage compared with the related continuously variable transmission. That is, in the related continuously variable transmission, the drilling tool is set between the inner cylinder portion and the outer cylinder portion of the driving-side movable sheave and the fluid passage is formed at an angle from the outer periphery of the inner cylinder portion toward the inner periphery of the inner cylinder portion. However, in the continuously variable transmission according to the invention, it is not necessary to form this kind of fluid passage, so forming the fluid passage is less troublesome. Also, the driven-side communicating fluid passage can be formed in the driven-side cylinder member at the same time the through-hole is formed in the driven-side cylinder member, in a single press-forming process using a hole-making machine such as a punch press. In addition, burrs formed in the through-hole and the driven-side communicating fluid passage can be removed at the same time in a single process. As a result, no special forming process is needed to form the driven-side communicating fluid passage, so forming the fluid passage is less troublesome.

Also, removing the burrs from deep inside the driven shaft internal fluid passage where they are hard to reach, which is where they form in the related art, is troublesome. However, in the continuously variable transmission according to the invention, burrs in the driven-side communicating passage are exposed to the outside and therefore can be easily removed, which makes forming the fluid passage less troublesome.

Also, the driving-side cylinder member may include a partition wall member and a pressing member. The partition wall member is fixed to the drive shaft and divides the driving-side cylinder into a sheave-side cylinder defined by the driving-side movable sheave and a member-side cylinder defined by the driving-side cylinder member. The pressing member divides the member-side cylinder into a member-side hydraulic cylinder defined by the driving-side cylinder member and a member-side air cylinder defined by the partition wall member inside the member-side cylinder, is supported by the partition wall member and the driving-side cylinder member so as to be able to move in the axial direction, and pushes the driving-side movable sheave in the axial direction using hydraulic pressure in the member-side hydraulic cylinder. Also, the driving-side communicating fluid passage may be formed in the partition wall member to communicate the member-side hydraulic cylinder, the sheave-side cylinder, and the drive shaft internal fluid passage together.

According to this structure, the partition wall member divides the driving-side cylinder into the sheave-side cylinder and the member-side cylinder, and the driving-side communicating fluid passage is formed to communicate the member-side hydraulic cylinder, the sheave-side cylinder, and the drive shaft internal fluid passage together. Therefore, the primary pulley has a so-called double piston structure. With this kind of double piston structure as well, the continuously variable transmission according to the invention is formed with a simple structure, which makes forming the oil passage less troublesome and thus improves production efficiency. The primary pulley having the double piston structure improves hydraulic pressure response more than a primary pulley having a single piston structure. Also, the primary pulley having the double piston structure has a greater hydraulic pressure receiving area than a primary pulley having a single piston structure does, and is therefore able to transmit more power.

Also, the driving-side communicating fluid passage may be formed in plurality at equidistant locations on the circumference of the partition wall member.

According to this structure, hydraulic fluid that is supplied to the drive shaft internal fluid passage is able to be supplied more quickly into the sheave-side cylinder and the member-side hydraulic cylinder than when only a single driving-side communicating fluid passage is formed. Also, that hydraulic fluid is able to be supplied evenly into the annular sheave-side cylinder and the annular member-side hydraulic cylinder. As a result, shift response of the primary pulley can be improved.

Accordingly, this invention makes it possible to provide a continuously variable transmission that enables production efficiency to be improved by forming a fluid passage that communicates a cylinder to which hydraulic fluid is supplied with a fluid passage formed in a drive shaft with a simple structure, and thus reducing the trouble of forming the fluid passage.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 13 is a sectional of the continuously variable transmission according to the second example embodiment of the invention when the hydraulic fluid is drained from the primary pulley;

DETAILED DESCRIPTION OF EMBODIMENTS

First through third example embodiments of the present invention will be described in greater detail below with reference to the accompanying drawings.

Figure 1:
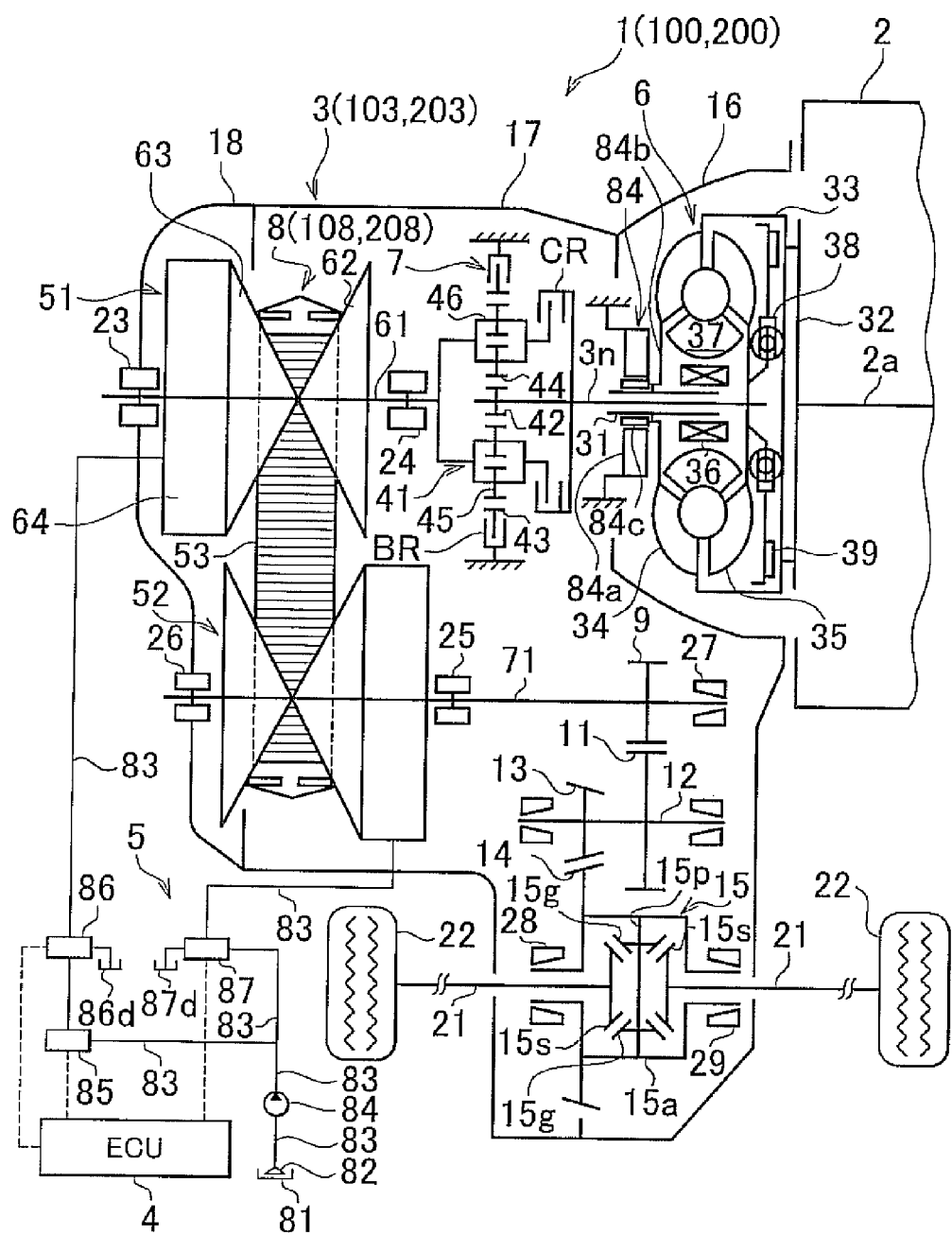
FIG. 1 is a skeleton view of a vehicle provided with a continuously variable transmission according to a first example embodiment of the invention.
Figure 2:
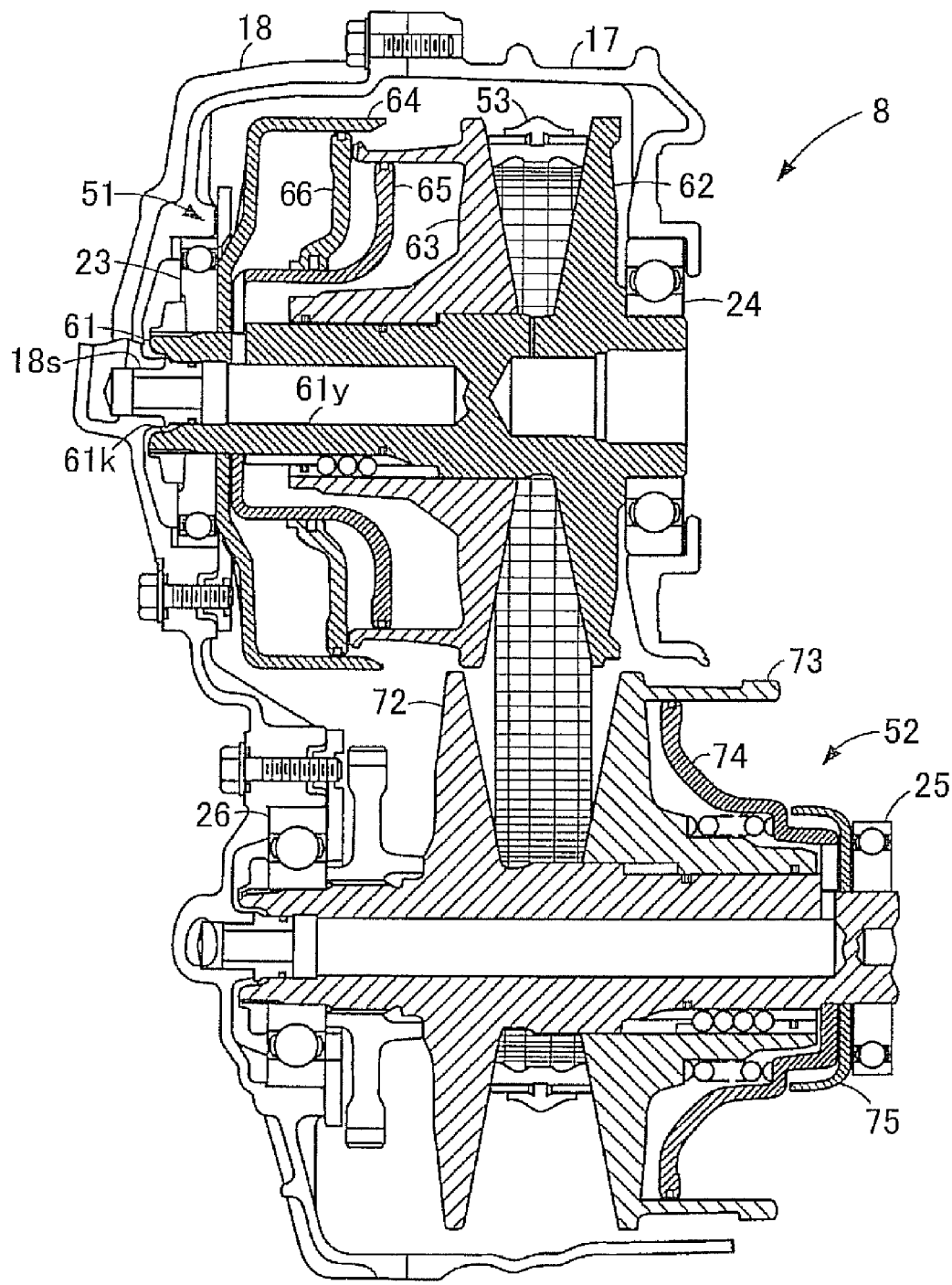
FIG. 2 is a sectional view of the continuously variable transmission according to the first example embodiment of the invention.
Figure 3:
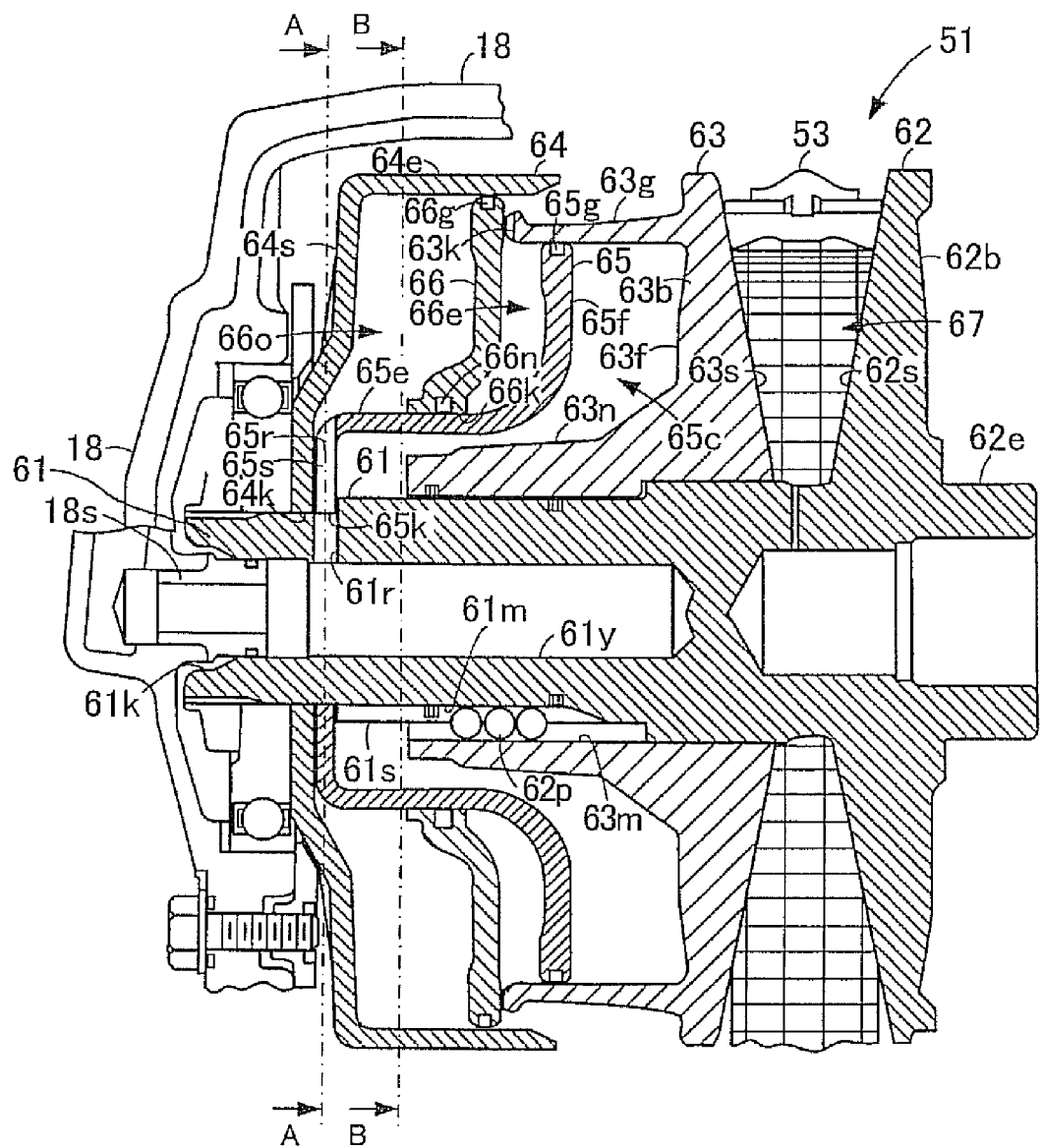
FIG. 3 is a partial enlarged sectional view of one portion of the continuously variable transmission shown in FIG. 2.
Figure 4A:
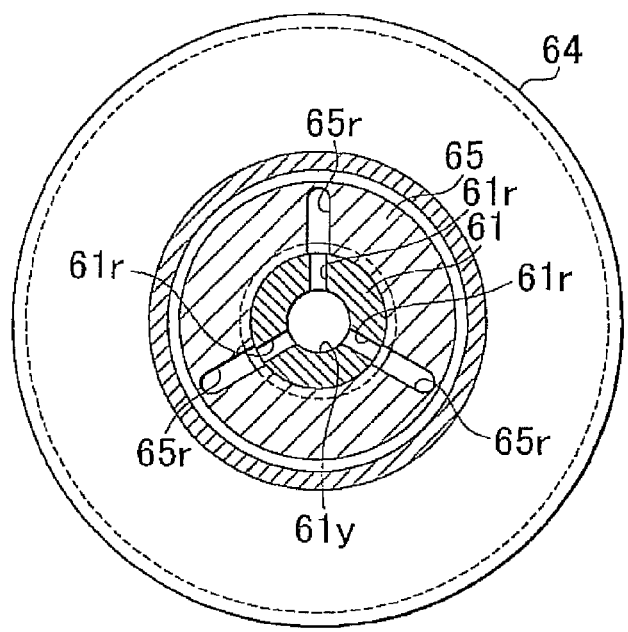
FIG. 4A is a sectional view taken along section A-A in FIG. 3.
Figure 4B:
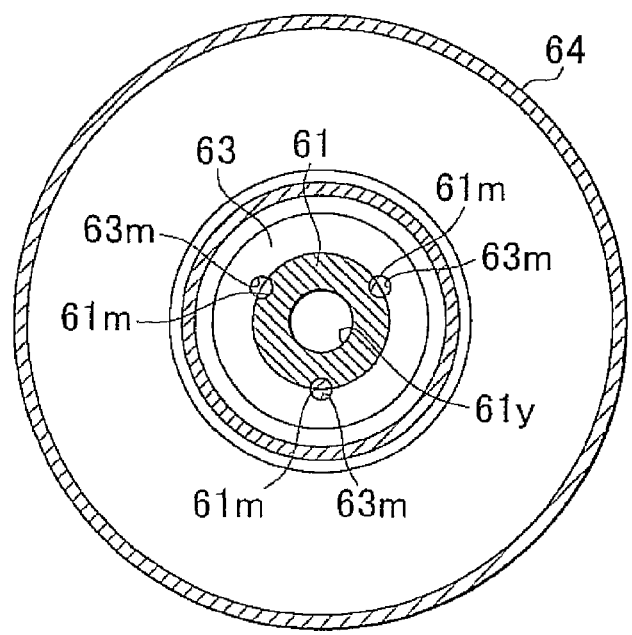
FIG. 4B is a sectional view taken along section B-B in FIG. 3.
Figure 5:
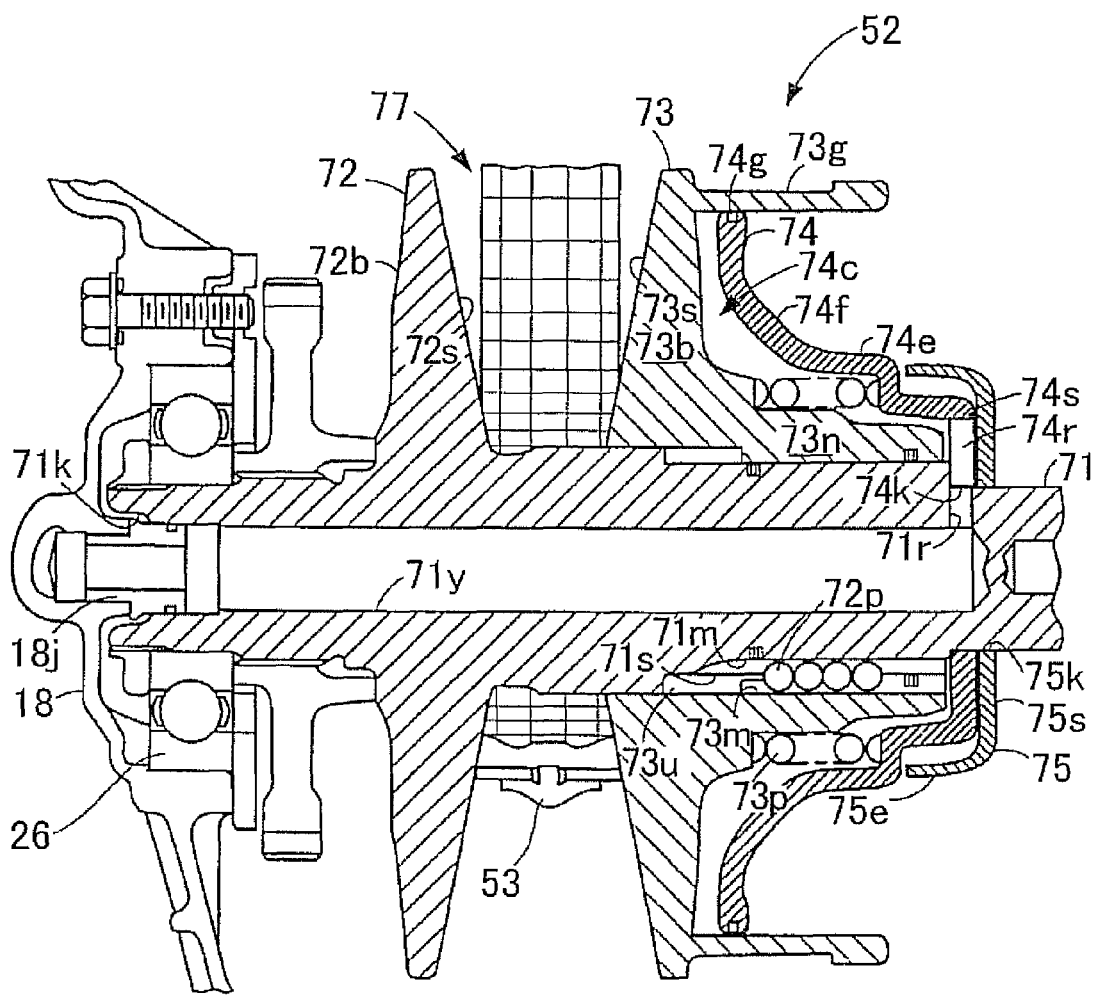
FIG. 5 is a partial enlarged sectional view of another portion of the continuously variable transmission shown in FIG. 2.

FIG. 1 is a skeleton view of a vehicle provided with a continuously variable transmission according to a first example embodiment of the invention. FIG. 2 is a sectional view of the continuously variable transmission, and FIG. 3 is a partial enlarged sectional view of one portion of the continuously variable transmission shown in FIG. 2. FIG. 4A is a sectional view taken along section A-A in FIG. 3, and FIG. 4B is a sectional view taken along section B-B in FIG. 3. FIG. 5 is a partial enlarged sectional view of another portion of the continuously variable transmission shown in FIG. 2.

First the structure will be described. As shown in FIG. 1, a vehicle according to the first example embodiment is configured as a front-wheel-drive vehicle (i.e., FF: Front engine, Front drive) and is provided with an engine 2. In the first example embodiment, the engine 2 is a transverse-mounted gasoline engine, but the engine 2 is not limited to this. That is, the engine 2 may also be an internal combustion engine that uses a gas fuel or liquid such as gas oil, LPG, hydrogen, or bio-fuel or the like. The arrangement of the engine 2 is also not limited. That is, it may be longitudinal mounted or transverse mounted, etc. Also, the configuration of the engine also not limited. That is, the engine 2 may be an in-line engine, a horizontally opposed engine, or a V-type engine or the like. Further, the number of cylinders of the engine 2 is also not limited.

The vehicle 1 includes the engine 2 described above, a transaxle 3 that is arranged to the side of the engine 2 and coupled to a crankshaft 2a of the engine 2, an ECU (electronic control unit) 4 that controls the engine 2 and the transaxle 3, and a hydraulic fluid supply apparatus 5.

The transaxle 3 includes a torque converter 6 that is coupled to the crankshaft 2a, a forward-reverse switching mechanism 7 that is coupled to the torque converter 6 via an input shaft 3n, a continuously variably transmission (CVT) 8 that is coupled to the forward-reverse switching mechanism 7, a counter drive gear 9 that is coupled to the continuously variable transmission 8, a counter driven gear 11 that is in mesh with the counter driven gear 9, and an intermediate shaft 12 that supports the counter driven gear 11.

The transaxle 3 also includes a final drive gear 13 that is supported by the intermediate shaft 12, a ring gear 14 that is in mesh with the final drive gear 13, a differential 15 that is coupled to the ring gear 14, a transaxle housing 16 that houses these constituent elements, and a transaxle case 17, and a transaxle rear cover 18. The differential 15 is coupled to left and right front drive shafts 21, which are in turn coupled to left and right front wheels, respectively.

The torque converter 6 includes a drive plate 32, a front cover 33 that is fixed to the crankshaft 2a of the engine 2 via this drive plate 32, a pump impeller 34 that is mounted to the front cover 33, and a rotatable turbine runner 35 that is fixed to the input shaft 3n which extends along generally the same axis as the crankshaft 2a and is arranged facing the pump impeller 34. The torque converter 6 also includes a stator 37 that is set to be able to rotate in only one direction by a one-way clutch 36, a damper mechanism, and a lockup clutch 39 that is mounted to the damper mechanism 38. Also, a hollow shaft 31 is fixed to the stator 37 via the one-way clutch 36, and the input shaft 3n is inserted through this hollow shaft 31.

When the front cover 33 and the pump impeller 34 of the torque converter 6 rotates when the engine 2 is operated, the flow of hydraulic fluid drags the turbine runner 35 along, and as a result, the turbine runner 35 starts to rotate. The stator 37 is designed such that when the difference between the rotation speed of the pump impeller 34 and the rotation speed of the turbine runner 35 is large, the flow of hydraulic fluid changes directions so that it helps the pump impeller 34 rotate.

The torque converter 6 functions as a torque multiplier when the difference between the rotation speed of the pump impeller 34 and the rotation speed of the turbine runner 35 is large, and functions as a fluid coupling when that difference is small. After the vehicle 1 takes off from a standstill and reaches a predetermined vehicle speed, the lockup clutch 39 activates so that power transmitted from the engine 2 to the front cover 33 is transmitted directly to the input shaft 3n. Also, any fluctuation in the power transmitted from the front cover 33 to the input shaft 3n is absorbed by the damper mechanism 38.

The forward-reverse switching mechanism 7 includes a double pinion planetary gear set 41. This double pinion planetary gear set 41 includes a sun gear 42 that is mounted to the end portion on the continuously variable transmission 8 side of the input shaft 3n, a ring gear 43 that is concentrically arranged on the outer peripheral side of the sun gear 42, a plurality of pinions 44 that are in mesh with the sun gear 42, a plurality of pinions 45 that are in mesh with both the ring gear 43 and the pinions 44, and a carrier 46 that pivotally supports the pinions 44 and 45 and retains those pinions 44 and 45 so that they are able to revolve together around the sun gear 42.

The carrier 46 of the forward-reverse switching mechanism 7 is fixed to the continuously variable transmission 8. The power transmitting path between the carrier 46 and the input shaft 3n is able to be established or interrupted using a forward clutch CR. Also, the forward-reverse switching mechanism 7 has a reverse brake BR that controls whether the ring gear 43 rotates or is held stationary.

As shown in FIGS. 2 and 3, the continuously variable transmission 8 includes a primary pulley 51, a secondary pulley 52, and a drive belt 53.

The primary pulley 51 is formed with a so-called double piston and includes a drive shaft 61, a driving-side fixed sheave 62, a driving-side movable sheave 63, a driving-side cylinder member 64, a partition wall member 65, and a pressing member 66.

The drive shaft 61 has a drive shaft internal fluid passage 61y that is open at one end portion in the axial direction. A seal member 18s provided on the transaxle rear cover 18 is inserted into the open portion 61k. Also, drive shaft internal fluid passages 61r that open at the outer peripheral surface and are communicated with the drive shaft internal fluid passage 61y are formed in three equidistant locations on the circumference of the drive shaft 61, as shown in FIG. 4A. Also, a hydraulic fluid supply passage, not shown, that is open at the outer peripheral surface and is communicated with the drive shaft internal fluid passage 61y is also formed in the drive shaft 61. Hydraulic fluid is supplied from the fluid supply apparatus 5 into the drive shaft internal fluid passage 61y via this hydraulic fluid supply passage.

The driving-side fixed sheave 62 is integrally formed with the drive shaft 61 at the other end portion of the drive shaft 61 in the axial direction. Also, ball spline grooves 61m are formed in three equidistant locations on the circumference of the outer peripheral portion of the drive shaft 61, as shown in FIG. 4B. The drive shaft 61 is rotatably supported by a bearing 24 provided on the transaxle case 17 and a bearing 23 provided on the transaxle rear cover 18, both of which are shown in FIG. 1, and coupled to the carrier 46 of the forward-reverse switching mechanism 7, such that power is input to the drive shaft 61 from the forward-reverse switching mechanism 7.

The driving-side fixed sheave 62 has a belt squeezing portion 62b and a cylindrical portion 62e that forms part of the drive shaft 61, as shown in FIG. 3. The driving-side fixed sheave 62 is arranged facing the driving-side movable sheave 63 in the axial direction. An annular pulley groove 67 that has a generally V-shaped cross-section that the drive belt 53 winds around is partially defined by a side portion 62s of the belt squeezing portion 62b that faces the driving-side movable sheave 63. This annular pulley groove 67 is supported by the bearing 24 shown in FIG. 1 at the cylindrical portion 62e.

The driving-side movable sheave 63 includes a belt squeezing portion 63b, and an inner cylinder portion 63n and an outer cylinder portion 63g that are formed protruding to the side opposite the pulley groove 67. The driving-side movable sheave 63 is arranged facing the driving-side fixed sheave 62 in the axial direction. The pulley groove 67 described above is partially defined by a side portion 63s of the belt squeezing portion 63b that faces the driving-side fixed sheave 62. The drive belt 53 is sandwiched between this side portion 63s and the side portion 62s of the driving-side fixed sheave 62 by a predetermined pressure.

Ball spline grooves 63m are formed in three equidistant locations on the circumference of the inner cylinder portion 63n, as shown in FIG. 4B. Also, ball splines 62p are interposed between these ball spline grooves 63m and the ball spline grooves 61m of the drive shaft 61, as shown in FIG. 3, such that the driving-side movable sheave 63 moves smoothly in the axial direction, as well as rotates together with the drive shaft 61.

The driving-side cylinder member 64 has a disc-shaped side portion 64s and a cylindrical portion 64e formed protruding from the side portion 64s toward the driving-side movable sheave 63 side. A through-hole 64k is formed in the side portion 64s. The drive shaft 61 is press-fitted into this through-hole 64k, and the driving-side cylinder member 64 is fixed to the drive shaft 61 such that it rotates together with the drive shaft 61. The cylindrical portion 64e defines an annular driving-side cylinder 64c to which hydraulic fluid is supplied by housing part of an outer cylinder portion 63g of the driving-side movable sheave 63 and covering the side portion 63f of the driving-side movable sheave 63 on the outer cylinder portion 63g side.

The partition wall member 65 has a disc-shaped side portion 65s, a cylindrical portion 65e that is formed protruding from the side portion 65s toward the driving-side movable sheave 63 side, and a flange portion 65f formed extending radially from the end portion of the cylindrical portion 65e. A through-hole 65k is formed in this side portion 65s, and the drive shaft 61 is press-fitted into this through-hole 65k. The partition wall member 65 is fixed to the drive shaft 61, with the side portion 65s closely contacting the side portion 64s of the driving-side cylinder member 64, such that the partition wall member 65 rotates together with the drive shaft 61 and the driving-side cylinder member 64.

Also, driving-side communicating fluid passages 65r that are communicated with the drive shaft internal fluid passages 61r of the drive shaft 61 are formed in three equidistant locations on the circumference of the side portion 65s, as shown in FIG. 4A. The inner cylinder portion 63n of the driving-side movable sheave 63 is housed inside the cylindrical portion 65e.

A seal ring 65g is fitted around the outer periphery of the flange portion 65f such that when the driving-side movable sheave 63 moves, a liquid-tight seal is maintained between the inner peripheral surface of the outer cylinder portion 63g of the driving-side movable sheave 63 and the outer peripheral surface of the flange portion 65f.

An annular sheave-side cylinder 65c is defined by the surface of this partition wall member 65 on the driving-side movable sheave 63 side, the surface of the driving-side movable sheave 63 on the partition wall member 65 side, and the outer peripheral surface of the drive shaft 61. Hydraulic fluid inside the drive shaft internal fluid passage 61y is supplied into this sheave-side cylinder 65c from the drive shaft internal fluid passages 61r and the driving-side communicating passages 65r.

The pressing member 66 is formed in a disc shape with a through-hole 66k that extends in the axial direction formed in it. The cylindrical portion 65e of the partition wall member 65 is inserted into this through-hole 66k, such that the pressing member 66 rotates together with the partition wall member 65. Also, the pressing member 66 is slidably supported by the cylindrical portion 65e of the partition wall member 65 and the cylindrical portion 64e of the driving-side cylinder member 64, and pushes the outer cylinder portion 63g of the driving-side movable sheave 63.

A seal ring 66g is fitted on the outer periphery of the pressing member 66, and a seal ring 66n is fitted on the inner periphery of the pressing member 66, so that when the pressing member 66 moves, a liquid-tight seal is maintained between the outer peripheral surface of the cylindrical portion 65e of the partition wall member 65 and the inner peripheral surface of the partition wall member 65.

An annular member-side air cylinder 66e is defined by the surface of this pressing member 66 on the partition wall member 65 side, the surface of the partition wall member 65 on the pressing member 66 side, and the inner peripheral surface of the outer cylinder portion 63g of the driving-side movable sheave 63. A through-hole 63k is formed in the end portion of the outer cylindrical portion 63g of the driving-side movable sheave 63, such that air in the member-side air cylinder 66e can be discharged to the outside and outside air can be drawn into the member-side air cylinder 66e. As a result, air pressure will not build up inside the member-side air cylinder 66e so the sliding of the pressing member 66 will not be impeded.

Also, an annular member-side hydraulic cylinder 66o is defined by the surface of the pressing member 66 on the driving-side cylinder member 64 side, the surface of the driving-side cylinder member 64 on the pressing member 66 side, and the outer peripheral surface of the cylindrical portion 65e of the partition wall member 65.

Hydraulic fluid in the drive shaft internal fluid passage 61y is supplied to this member-side hydraulic cylinder 66o from the drive shaft internal fluid passages 61r and the driving-side communicating fluid passages 65r. Incidentally, the member-side hydraulic cylinder 66o and the member-side air cylinder 66e each form a member-side cylinder of the invention.

The secondary pulley 52 is formed with a so-called single piston and includes a driven shaft 71 that is parallel to the drive shaft 61, a driven-side fixed sheave 72, a driven-side movable sheave 73, a driven-side cylinder member 74, and a cover member 75, as shown in FIGS. 2 and 5.

The driven shaft 71 has a driven shaft internal fluid passage 71y that is open at one end portion in the axial direction. A seal member 18j provided on the transaxle rear cover 18 is inserted into the open portion 71k. Also, driven shaft internal fluid passages 71r that are open at the outer peripheral surface and communicated with the driven shaft internal fluid passage 71y are formed in three equidistant locations on the circumference of the driven shaft 71, just like the drive shaft 61. Also, a fluid supply passage, not shown, that is open at the outer peripheral surface and is communicated with the driven shaft internal fluid passage 71y is also formed in the driven shaft 71. Hydraulic fluid is supplied from the fluid supply apparatus 5 to the driven shaft internal fluid passage 71y via this hydraulic supply passage.

The driven-side fixed sheave 72 is integrally formed in the driven shaft 71 at the open portion 71k of the driven shaft 71.

Also, ball spline grooves 71m are formed in three equidistant locations on the circumference of the outer peripheral portion of the driven shaft 71, just as with the drive shaft 61. The driven shaft 71 is rotatably supported by a bearing 25 provided on the transaxle case 17, a bearing 26 provided on the transaxle rear cover 18, and a bearing 27 provided on the transaxle housing 16, all of which are shown in FIG. 1, such that the power of the drive shaft 61 is transmitted to the driven shaft 71 via the drive belt 53.

The driven-side fixed sheave 72 has a belt squeezing portion 72b just like the driving-side fixed sheave 62, and is arranged facing the driven-side movable sheave 73 in the axial direction. An annular pulley groove 77 that has a generally V-shaped cross-section that the drive belt 53 winds around is partially defined by a side portion 72s of the belt squeezing portion 72b that faces the driven-side movable sheave 73.

The driven-side movable sheave 73 includes a belt squeezing portion 73b, and an inner cylinder portion 73n and an outer cylinder portion 73g that are formed protruding to the side opposite the pulley groove 77, just like the driving-side movable sheave 63. The driven-side movable sheave 73 is arranged facing the driven-side fixed sheave 72 in the axial direction. The pulley groove 77 described above is partially defined by a side portion 73s of the belt squeezing portion 73b that faces the driven-side fixed sheave 72. The drive belt 53 is sandwiched between this side portion 73s and the side portion 72s of the driven-side fixed sheave 72 by a predetermined pressure.

Ball spline grooves 73m are formed in three equidistant locations on the circumference of the inner cylinder portion 73n, just like the driving-side movable sheave 63. Also, ball splines 72p are interposed between these ball spline grooves 73m and the ball spline grooves 71m of the driven shaft 71, as shown in FIG. 3, such that the driven-side movable sheave 73 moves smoothly in the axial direction, as well as rotates together with the driven shaft 71. Also, a coil spring 73p surrounds the outer periphery of the inner cylinder portion 73n and is interposed between the driven-side movable sheave 73 and the driven-side cylinder member 74. This coil spring 73p applies urging force that pushes the driven-side movable sheave 73 toward the driven-side fixed sheave 72 side.

The driven-side cylinder member 74 has a disc-shaped side portion 74s, a cylindrical portion 74e formed protruding from the side portion 74s toward the driven-side movable sheave 73 side, and a flange portion 74f that extends radially outward from the cylindrical portion 74e.

A through-hole 74k is formed in the side portion 74s. The driven shaft 71 is press-fitted into this through-hole 74k, and the driven-side cylinder member 74 is fixed to the driven shaft 71 such that it rotates together with the driven shaft 71. The cylindrical portion 74e houses the coil spring 73p and part of the inner cylinder portion 73n of the driven-side movable sheave 73.

A seal ring 74g is fitted around the outer periphery of the flange portion 74f such that when the driven-side movable sheave 73 moves, a liquid-tight seal is maintained between the inner peripheral surface of the outer cylinder portion 73g of the driven-side movable sheave 73 and the outer peripheral surface of the flange portion 74f.

An annular driven-side cylinder 74c is defined by the surface of the driven-side cylinder member 74 on the driven-side movable sheave 73 side, the surface of the driven-side movable sheave 73 on the driven-side cylinder member 74 side, and the outer peripheral surface of the driven shaft 71. Driven-side communicating fluid passages 74r that communicate the driven shaft internal fluid passages 71r of the driven shaft 71 with the driven-side cylinder 74c are formed in equidistant locations on the circumference of the driven-side cylinder member 74, just like the driving-side communicating fluid passages 65r of the partition wall member 65. Hydraulic fluid inside the driven shaft internal fluid passage 71y is supplied to this driven-side cylinder 74c from the driven shaft internal fluid passages 71r and the driven-side communicating passages 74r.

The cover member 75 has a disc-shaped side portion 75s and a cylindrical portion 75e formed protruding toward the driven-side movable sheave 73 side from the side portion 75s. A through-hole 75k is formed in the side portion 75s, and the driven shaft 71 is press-fitted into this through-hole 75k. The cover member 75 is fixed to the driven shaft 71, with the side portion 75s closely contacting the side portion 74s of the driven-side cylinder member 74, such that the cover member 75 rotates together with the driven shaft 71 and the driven-side cylinder member 74.

The drive belt 53 is formed of an endless belt that has many metal pieces and a plurality of steel rings to transmit a large amount of power. This drive belt 53 is wound around the pulley groove 67 of the primary pulley 51 and the pulley groove 77 of the secondary pulley 52. Power input from the torque converter 6 to the primary pulley 51 via the forward-reverse switching mechanism 7 and the drive shaft 61 is output from the primary pulley 51 to the driven shaft 71 via the secondary pulley 52 at a predetermined speed ratio. This output power is transmitted to the differential 15 via the counter drive gear 9 that is spline-coupled to the outer peripheral portion of this driven shaft 71, as shown in FIG. 1.

The differential 15 is provided with a hollow differential case 15a. This differential case 15a is rotatably supported by a bearing 28 provided on the transaxle case 17 and a bearing 29 provided on the transaxle housing 16. The ring gear 14 is fixed to an outer peripheral portion of the differential case 15a. A pinion shaft 15p is supported in the differential case 15a, and a pair of pinions 15g are rotatably supported on the pinion shaft 15p.

This pair of pinions 15g are in mesh with a pair of side gears 15s, one of which is connected to a left front drive shaft 21 and the other of which is connected to a right front drive shaft 21. The right front drive shaft 21 is connected to a left front wheel 22 and the right front drive shaft 21 is connected to a right front wheel 22.

The ECU 4 includes a CPU (Central Processing Unit), ROM (Read Only Memory), RAM (Random Access Memory) that temporarily stores data, EEPROM (Electronically Erasable and Programmable Read Only Memory) which is electrically rewritable non-volatile memory, an input interface circuit that includes an A/D converter and a buffer and the like, and an output interface circuit that includes drive circuit and the like.

Various sensors that detect the operating state of the engine 2 are connected to the input interface circuit of the ECU 4. Information output from these sensors is then read by the ECU 4 via the input interface circuit. The ECU 4 then controls various parts of the vehicle 1, such as the engine 2 and the transaxle 3, based on this information as well as information such as the data stored in the ROM.

The hydraulic fluid supply apparatus 5 includes an oil pan 81 that collects hydraulic fluid, an oil strainer 82 through which the hydraulic fluid in the oil pan 81 is drawn up, a fluid passage portion 83 that has a passage for supplying hydraulic fluid, an oil pump 84, a primary regulator valve 85, a primary shift valve 86, and a secondary shift valve 87.

The primary regulator valve 85 is formed of a regulator valve that regulates the pressure, for example. This primary regulator valve 85 regulates the line pressure generated by the oil pump 84 to a predetermined pressure. The primary regulator valve 85 is connected to a solenoid valve, not shown, controlled by the ECU 4, and is controlled by signal pressure sent from that solenoid valve.

The primary shift valve 86 is formed of a regulator valve that regulates pressure, just like the primary regulator valve 85. This primary shift valve 86 supplies shift pressure to execute a shift to the primary pulley 51. Also, the primary shift valve 86 has a drain 86d. Hydraulic fluid discharged from the primary pulley 51 is discharged to the fluid passage portion 83 via this drain 86d.

The secondary shift valve 87 is also formed of a regulator valve that regulates pressure, just like the primary shift valve 86. This secondary shift valve 87 supplies shift pressure to execute a shift to the secondary pulley 52. Also, the secondary shift valve 87 has a drain 87d. Hydraulic fluid discharged from the secondary pulley 52 is discharged to the fluid passage portion 83 via this drain 87d, and circulated into the oil pan 81.

Hydraulic fluid in the oil pan 81 is drawn up by the oil pump 84 and flows into the fluid passage portion 83, where the hydraulic pressure is regulated by the primary regulator valve 85 and the primary shift valve 86. The hydraulic fluid continues to flow through the fluid passage portion 83 and is supplied to the primary pulley 51. Also, the hydraulic fluid also flows through the fluid passage portion 83 and the hydraulic pressure of that hydraulic fluid is regulated by the secondary shift valve 87. The hydraulic fluid then continues to flow through the fluid passage portion 83 and is supplied to the secondary pulley 52. The hydraulic fluid that has been supplied to the primary pulley 51 and used as the hydraulic power medium then flows through the fluid passage portion 83 and is circulated to the oil pan 81 via the drain 86d of the primary shift valve 86.

Also, the hydraulic fluid that has been supplied to the secondary pulley 52 and used as the hydraulic power medium then flows through the fluid passage portion 83 and is circulated to the oil pan 81 via the drain 87d of the secondary shift valve 87.

The primary regulator valve 85, the primary shift valve 86, and the secondary shift valve 87 are all connected to the ECU 4, as indicated by the dotted lines. The ECU 4 controls these valves to supply hydraulic fluid at a predetermined hydraulic pressure to the primary pulley 51 and the secondary pulley 52 according to the operation of the driver of the vehicle 1 and the operating state of the vehicle 1.

The oil pump 84 is formed of a pump that draws up hydraulic fluid and discharges it, such as a gear pump or a trochoid pump or the like. The oil pump 84 includes a main body 84a that is fixed to the transaxle case 17 and a rotor 84c that is connected to the pump impeller 34 of the torque converter 6 via a hub 84b. The hub 84b is spline-engaged with the hollow shaft 31 of the torque converter 6. Accordingly, the power from the engine 2 is transmitted to the hollow shaft 31 via the pump impeller 34, and the rotor 84c rotates together with the hollow shaft 31, thereby driving the oil pump 84.

This oil pump 84 may also has a structure other than the structure shown in FIG. 1. For example, it may also be formed by hydraulic fluid supplying means such as a trochoid pump that is connected to the crankshaft 2a either directly or indirectly via a transmitting member such as a chain.

Figure 6:
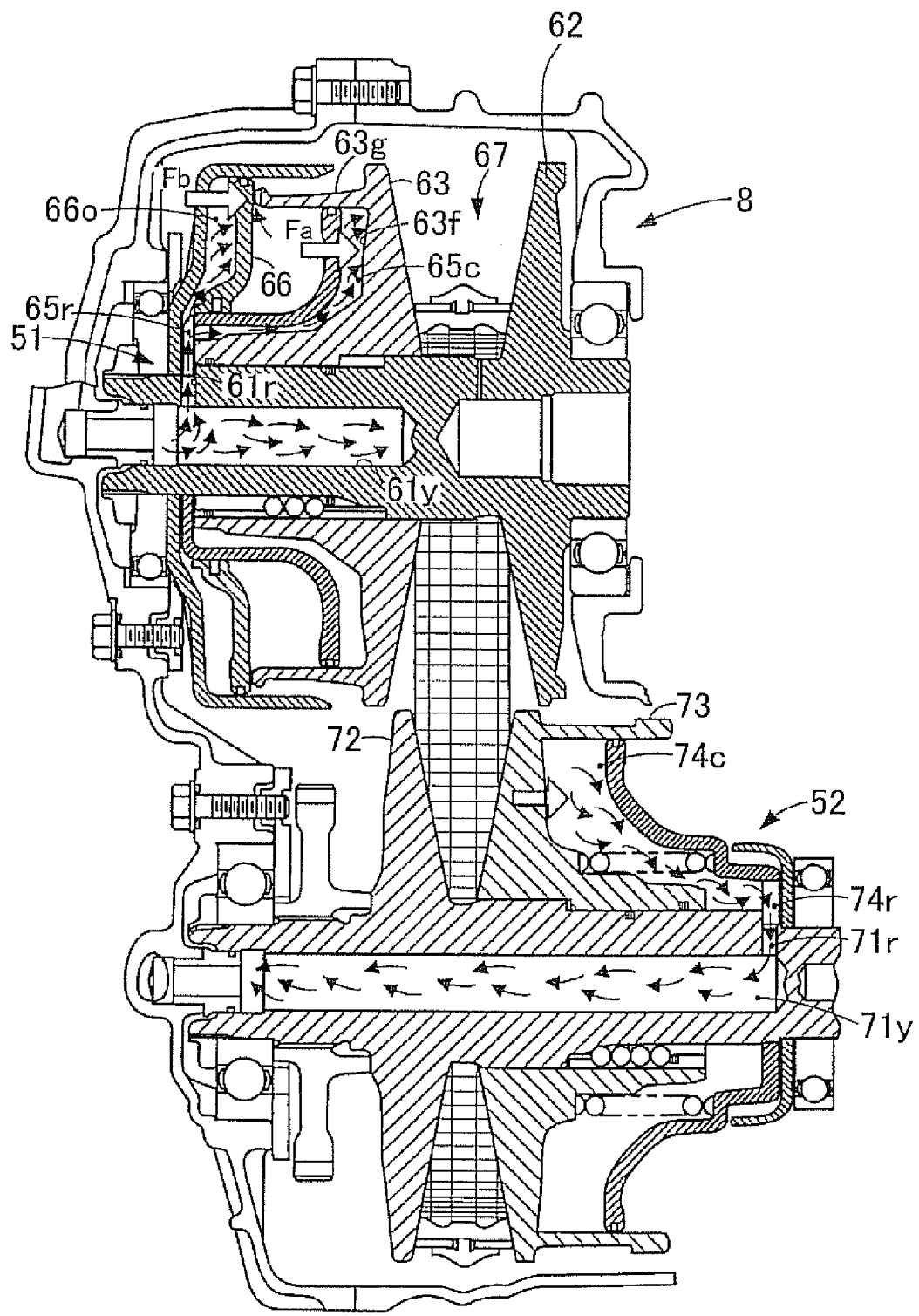
FIG. 6 is a sectional view of the continuously variable transmission according to the first example embodiment of the invention when hydraulic fluid is supplied to the primary pulley.
Figure 7:
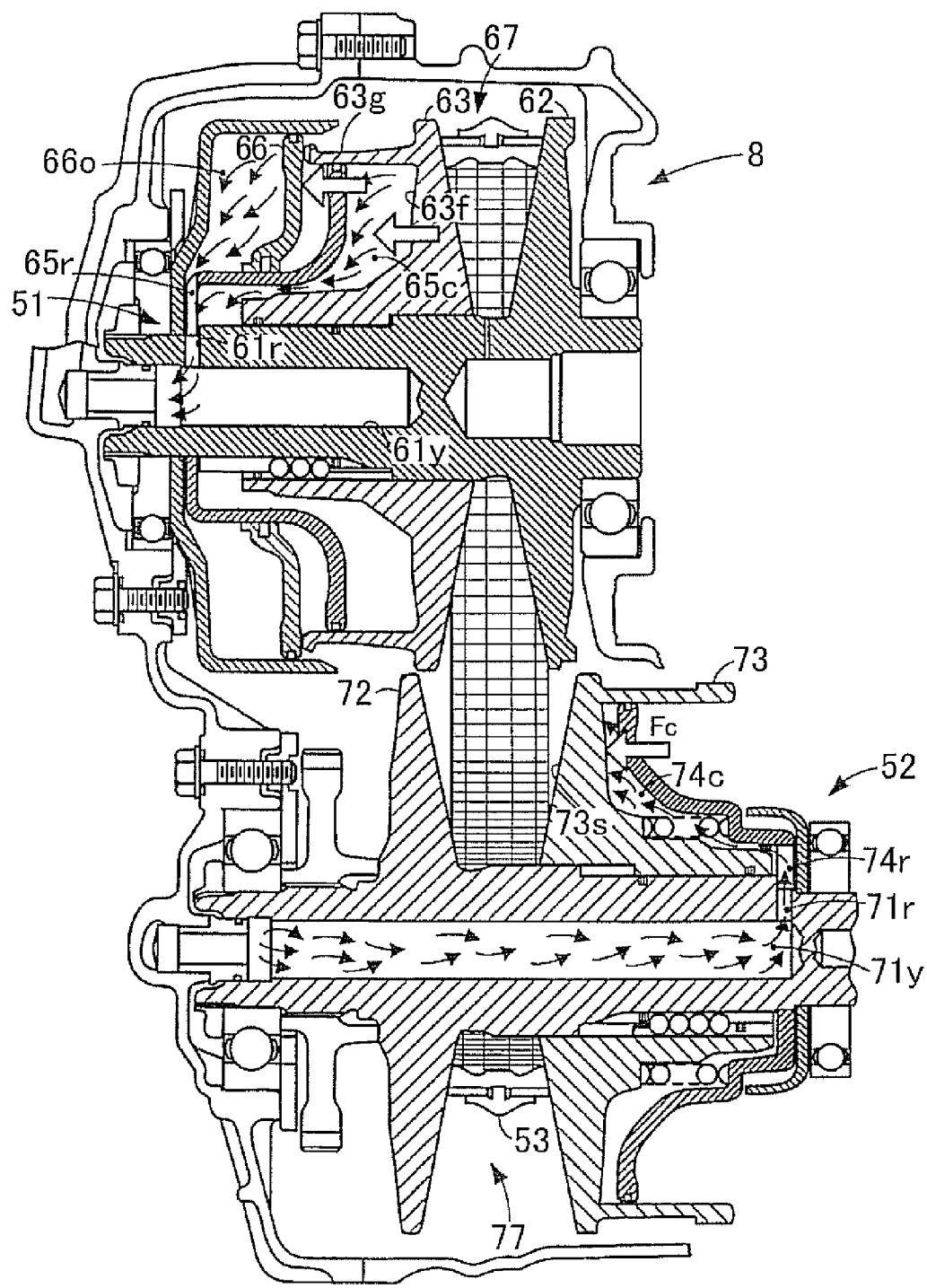
FIG. 7 is a sectional view of the continuously variable transmission according to the first example embodiment of the invention when hydraulic fluid is drained from the primary pulley.

Next, the operation of the continuously variable transmission 8 according to the first example embodiment will be described. FIG. 6 is a sectional view of the continuously variable transmission according to the first example embodiment when hydraulic fluid is supplied to the primary pulley. FIG. 7 is a sectional view of the continuously variable transmission according to the first example embodiment when hydraulic fluid is drained from the primary pulley.

In the continuously variable transmission 8 according to the first example embodiment, when the engine 2 is driven, the drive plate 32 of the torque converter 6, the front cover 33, and the pump impeller 34 rotate via the crankshaft 2a, as shown in FIG. 1. The circulation flowrate of the hydraulic fluid generated inside the torque converter 6 at this time drags the turbine runner 5 so that it rotates, at which time the input shaft 3n also rotates.

When the input shaft 3n rotates, the sun gear 42 of the planetary gear set 41 of the forward-reverse switching mechanism 7 rotates, causing the pinions 44 and 45, and thus the carrier 46, to also rotate. At this time, the ECU 4 appropriately switches to forward or reverse by appropriately controlling the forward clutch CR and the reverse brake, i.e., applying or releasing the forward clutch CR and applying or releasing the reverse brake BR, according to the operation by the driver and the operating state of the vehicle 1.

Then the rotation of the carrier 46 is transmitted to the primary pulley 51 via the drive shaft 61, and when the primary pulley 51 rotates, the secondary pulley 52 rotates via the drive belt 53 such that the driven shaft 71 also rotates. At the same time, the counter drive gear 9 rotates, such that the counter driven gear 11 and the final drive gear 13 also rotate, which causes the ring gear 14 to rotate. This activates the differential 15 such that the front drive shafts 21 rotate, ultimately transmitting the power to the front wheels 22.

Meanwhile, when the pump impeller 34 rotates, it causes the hollow shaft 31 as well as the rotor 84c of the oil pump 34 to rotate, such that hydraulic fluid inside the oil pan 81 is drawn up through the inlet of the oil strainer 82. After being strained by the oil strainer 82 to remove impurities, the hydraulic fluid then flows into the fluid passage portion 83 and into the oil pump 84. The hydraulic fluid is then discharged from the oil pump 84 at a pressure referred to as line pressure and is supplied at this line pressure to the primary regulator valve 85, the primary shift valve 86, and the secondary shift valve 87.

The ECU 4 controls the primary regulator valve 85, the primary shift valve 86, and the secondary shift valve 87 according to an operation of the driver of the vehicle 1 and the operating state of the vehicle 1, while hydraulic fluid at line pressure is supplied to those valves. As a result, a predetermined shift pressure that has been regulated is supplied to the sheave-side cylinder 65c and the member-side hydraulic cylinder 66o of the primary pulley 51 and the driven-side cylinder 74c of the secondary pulley 52, such that the power of the drive shaft 61 is output to the driven shaft 71 at a speed ratio appropriate for the operating state of the vehicle 1.

For example, when the vehicle 1 is accelerated, the ECU 4 performs control to establish a high speed ratio in response to the operation of an accelerator pedal, not shown. That is, the hydraulic pressure is increased to a predetermined shift pressure by the primary shift valve 86. The hydraulic fluid at this increased hydraulic pressure is supplied to the drive shaft internal fluid passage 61y, as shown in FIG. 6, via the fluid passage portion 83, passes through the drive shaft internal fluid passages 61r and the driving-side communicating fluid passages 65r, and is supplied to the sheave-side cylinder 65c and the member-side hydraulic cylinder 66o.

At this time, the hydraulic pressure inside the sheave-side cylinder 65c increases, such that hydraulic pressure is applied to the side portion 63f of the driving-side movable sheave 63 inside the sheave-side cylinder 65c. As a result, pressure Fa is applied in the direction of the driving-side fixed sheave 62 to the driving-side movable sheave 63. Also, the hydraulic pressure in the member-side hydraulic cylinder 66o increases the hydraulic pressure applied to the pressing member 66, such that pressure Pb is applied in the direction of the driving-side fixed sheave 62 to the pressing member 66. As a result, the pressing member 66 in turn applies the pressure Fb in the direction of the driving-side fixed sheave 62 to the driving-side movable sheave 63 at the outer cylinder portion 63g.

These pressures Fa and Fb cause the driving-side movable sheave 63 to move quickly toward the driving-side fixed sheave 62, thereby narrowing the pulley groove 67 such that the drive belt 53 slides radially outward and the belt radius on the driving side increases.

On the other hand, the ECU 4 shown in FIG. 1 opens the drain 87d of the secondary shift valve 87 and reduces the pressure in the driven-side cylinder 74c shown in FIG. 6. At this time, the hydraulic fluid in the driven-side cylinder 74c drains into the fluid passage portion 83 of the hydraulic fluid supply apparatus 5 through the driven-side communicating fluid passages 74r and the driven shaft internal fluid passages 71r and 71y. Then the pressures Fa and Fb of the driving-side movable sheave 63 cause the driven-side movable sheave 73 to move away from the driven-side fixed sheave 72 such that the drive belt 53 slides radially inward and the belt radius on the driven side decreases.

As a result, the speed ratio represented by the driven-side belt radius divided by the driving-side belt radius gradually and continuously (i.e., steplessly) becomes a high speed ratio, thereby accelerating the vehicle 1.

Also, when the vehicle 1 is decelerated, the ECU 4 performs control to establish a low speed ratio. That is, the secondary shift valve 87 increases the pressure to a predetermined shift pressure, as shown in FIG. 7.

The hydraulic fluid at this increased pressure is supplied to the driven shaft internal fluid passage 71y, as shown in FIG. 7, via the fluid passage portion 83, and then supplied to the driven-side cylinder 74c through the driven shaft internal fluid passages 71r and the driven-side communicating fluid passages 74r. At this time, the pressure in the driven-side cylinder 74c increases, which increases the pressure applied to the side portion 73s of the driven-side movable sheave 73 in the driven-side cylinder 74c, such that pressure Fc is applied in the direction of the driven-side fixed sheave 72 to the driven-side movable sheave 73.

This pressure Fc causes the driven-side movable sheave 73 to quickly move toward the driven-side fixed sheave 72, thereby narrowing the pulley groove 77 such that the drive belt 53 slides radially outward and the belt radius on the driving side increases.

On the other hand, the ECU 4 shown in FIG. 1 opens the drain 86d of the primary shift valve 86 and reduces the pressure in the sheave-side cylinder 65c and the member-side hydraulic cylinder 66o. At this time, the hydraulic fluid in the sheave-side cylinder 65c and the member-side hydraulic cylinder 66o drains into the fluid passage portion 83 of the hydraulic fluid supply apparatus 5 through the driving-side communicating fluid passages 65r and the drive shaft internal fluid passages 61r and 61y. Then the pressure Fc of the driven-side movable sheave 73 causes the driving-side movable sheave 63 to move away from the driving-side fixed sheave 62 such that the drive belt 53 slides radially inward and the belt radius on the driving side decreases.

As a result, the speed ratio represented by the driven-side belt radius divided by the driving-side belt radius gradually and continuously (i.e., steplessly) becomes a low speed ratio, thereby decelerating the vehicle 1.

The continuously variable transmission 8 according to the first example embodiment is structured as described above, which enables the effects described below to be obtained.

That is, the continuously variable transmission 8 according to the first example embodiment includes the primary pulley 51 that has the driving-side fixed sheave 62 that is fixed to the drive shaft 61, the driving-side movable sheave 63, and the driving-side cylinder member 64 that defines the driving-side cylinder 64c. The continuously variable transmission 8 also includes the secondary pulley 52 that has the driven-side fixed sheave 72 that is fixed to the driven shaft 71, the driven-side movable sheave 73, and the driven-side cylinder member 74 that defines the driven-side cylinder 74c. The continuously variable transmission 8 also includes the drive belt 53.

Also, in the continuously variable transmission 8, the driving-side cylinder member 64 is provided with a partition wall member 65 that defines the sheave-side cylinder 65c, and a pressing member 66 that defines the member-side hydraulic cylinder 66o and the member-side air cylinder 66e, and pushes the driving-side movable sheave 63 in the axial direction using the hydraulic pressure in the member-side hydraulic cylinder 66o. The drive shaft internal fluid passages 61y and 61r are formed in the drive shaft 61, and the driving-side communicating fluid passages 65r that communicate the sheave-side cylinder 65c, the member-side hydraulic cylinder 66o, and the drive shaft internal fluid passages 61r together are formed in the partition wall member 65.

According to this structure, hydraulic fluid supplied into the drive shaft internal fluid passage 61y is supplied to the sheave-side cylinder 65c and the member-side hydraulic cylinder 66o through the drive shaft internal fluid passages 61r and the driving-side communicating fluid passages 65r. Therefore, the structure is simpler than that of the related continuously variable transmission.

That is, in the related continuously variable transmission, the fluid passage extending at an angle from the outer periphery toward the inner periphery of the inner cylinder portion is formed using a drilling tool from between the inner cylinder portion and the outer cylinder portion of the driving-side movable sheave. However, in the continuously variable transmission according to the first example embodiment, it is not necessary to form this kind of fluid passage, so the structure is simpler. Also, the driving-side communicating fluid passages 65c for supplying hydraulic fluid to the sheave-side cylinder 65c and the member-side hydraulic cylinder 66o are formed in the partition wall member 65, as shown in FIGS. 3 and 4A, and thus provide a simple structure that is communicated with the drive shaft internal fluid passages 61r.

Also, the continuously variable transmission according to the first example embodiment improves production efficiency by reducing the trouble that it takes to form the fluid passages compared with the related continuously variable transmission. That is, in the related continuously variable transmission, the drilling tool is set between the inner cylinder portion and the outer cylinder portion of the driving-side movable sheave and the fluid passage is formed at an angle from the outer periphery of the inner cylinder portion toward the inner periphery of the inner cylinder portion. However, in the continuously variable transmission according to the first example embodiment, it is not necessary to form this kind of fluid passage, so forming the fluid passage is less troublesome.

Further, the driving-side communicating fluid passages 65r can be easily formed in the partition wall member 65 at the same time the through-hole 65k is formed in the partition wall member 65, in a single press-forming process using a hole-making machine such as a punch press. In addition, burrs formed in the through-hole 65k and the driving-side communicating fluid passages 65r can be removed at the same time in a single process. As a result, no special forming process is needed to form the driving-side communicating fluid passages 65r, so forming the fluid passages is less troublesome.

Also, removing the burrs from deep inside the drive shaft internal fluid passage where they are hard to reach, which is where they form in the related art, is troublesome. However, in the continuously variable transmission according to the first example embodiment, burrs in the driving-side communicating passages 65r are exposed to the outside and therefore can be easily removed, which makes forming the fluid passages less troublesome.

In the continuously variable transmission 8 of the vehicle 1 according to the first example embodiment, the hydraulic fluid supply apparatus 5 includes the primary regulator valve 85 that is connected to the oil pump 84, the primary shift valve 86 that is connected to the primary regulator valve 85, and the secondary shift valve 87 that is connected to the oil pump 84, and the primary pulley pressure is controlled as the shift pressure and the secondary pulley pressure is controlled as the line pressure throughout all of the speed ranges. Alternatively, however, in the continuously variable transmission of the invention, the hydraulic fluid supply apparatus may have other constituent elements.

For example, the hydraulic fluid supply apparatus may also be a so-called double pressure regulating type hydraulic fluid supply apparatus that includes a primary regulator valve that is connected to an oil pump, a primary shift valve that is connected to the primary regulator valve, and a secondary shift valve that is connected to the primary regulator valve. In this case, in a speed range on the low speed ratio side, the primary pulley pressure may be controlled as the shift pressure and the secondary pulley pressure may be controlled as the line pressure, and in a shift range on the high speed ratio side, the primary pulley pressure may be controlled as the line pressure and the secondary pulley pressure may be controlled as the shift pressure.

In the continuously variable transmission 8 of the vehicle 1 according to the first example embodiment, the driving-side communicating fluid passages 65r are formed in the primary pulley 51 and the driven-side communicating fluid passages 74r are formed in the secondary pulley 52. Alternatively, however, in the continuously variable transmission of the invention, only the driving-side communicating fluid passages may be formed in the primary pulley or only the driven-side communicating fluid passages may be formed in the secondary pulley.

Figure 8:
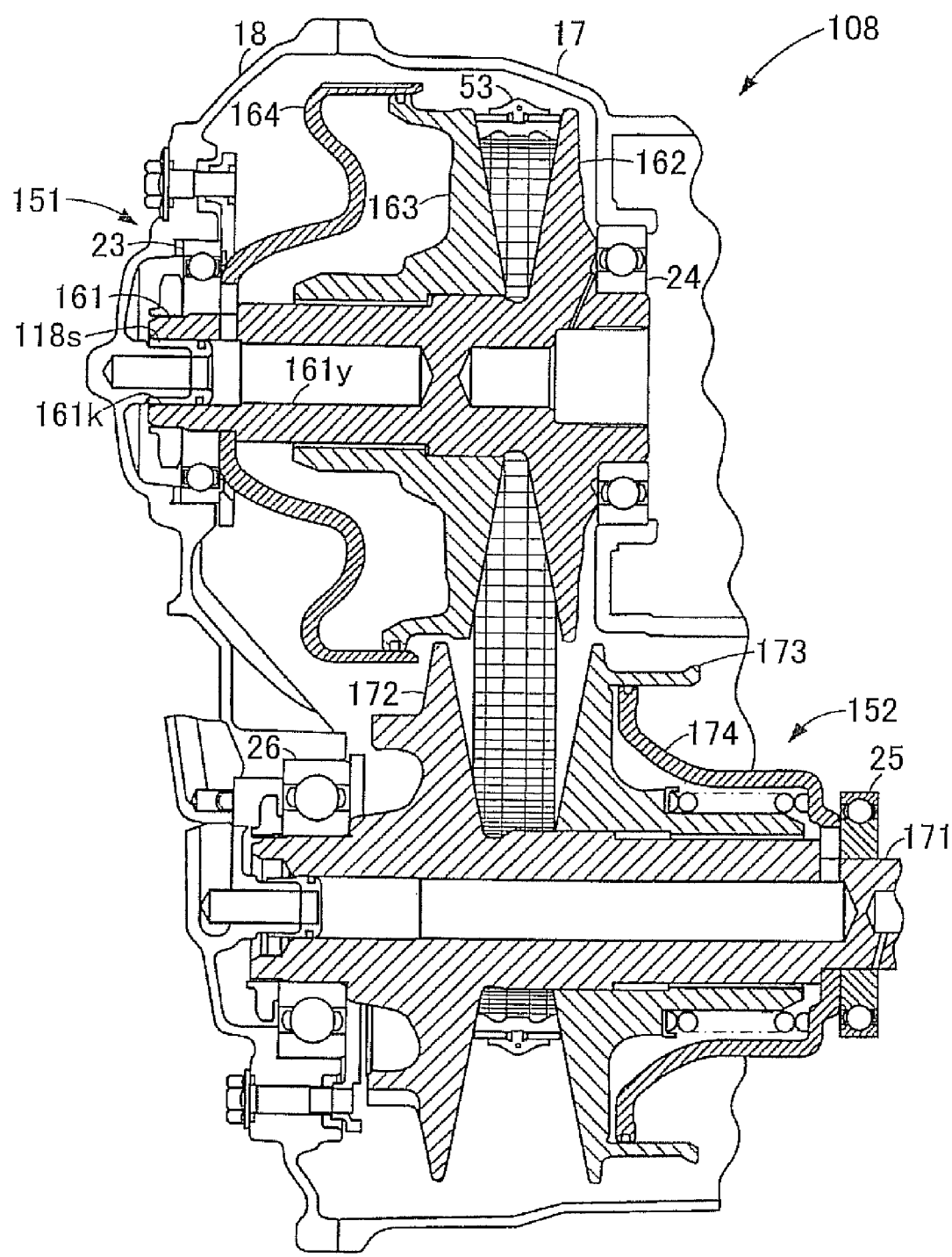
FIG. 8 is a sectional view of a continuously variable transmission according to a second example embodiment of the invention.
Figure 9:
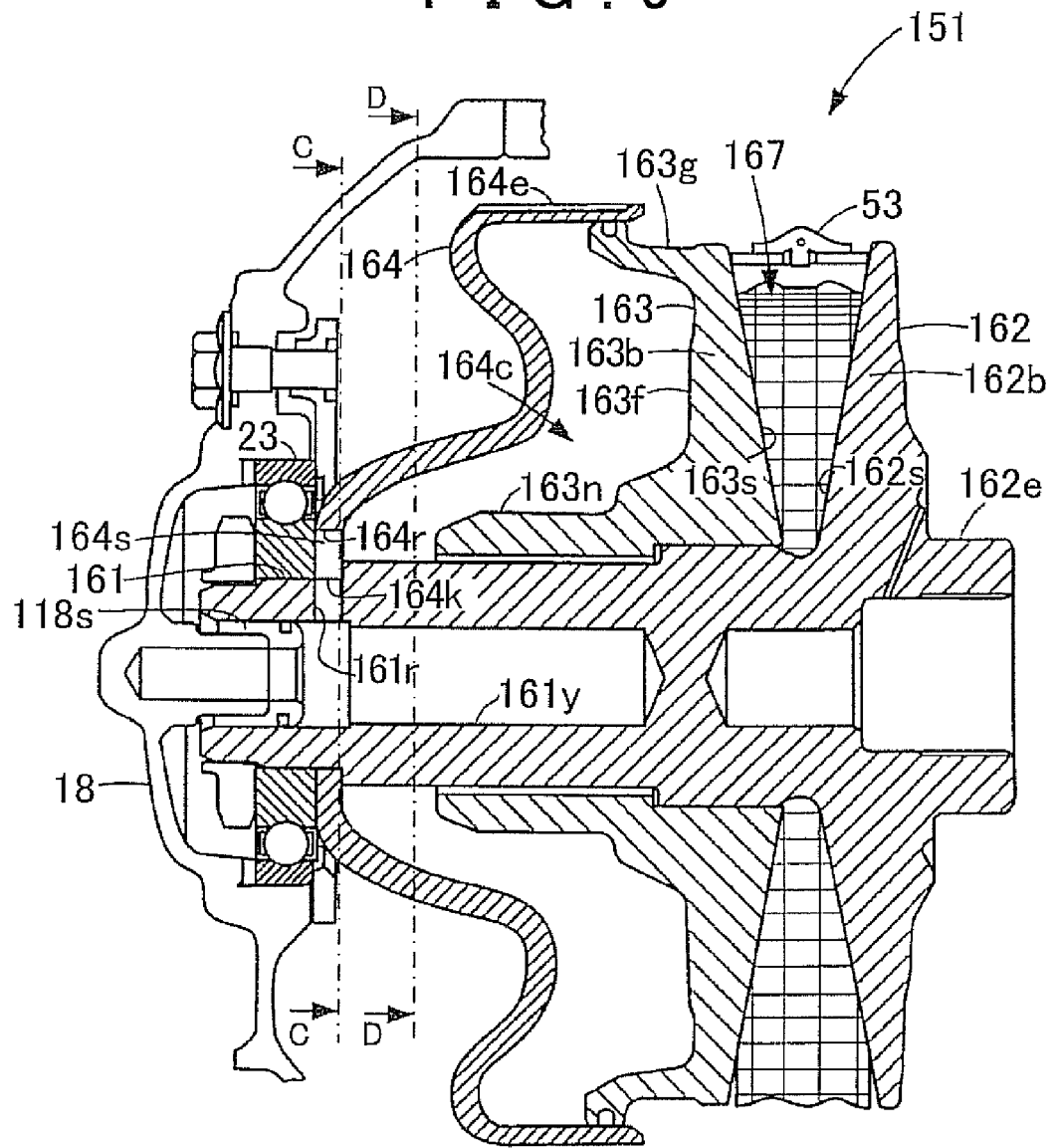
FIG. 9 is a partial enlarged sectional view of a portion of the continuously variable transmission shown in FIG. 8.
Figure 10A:
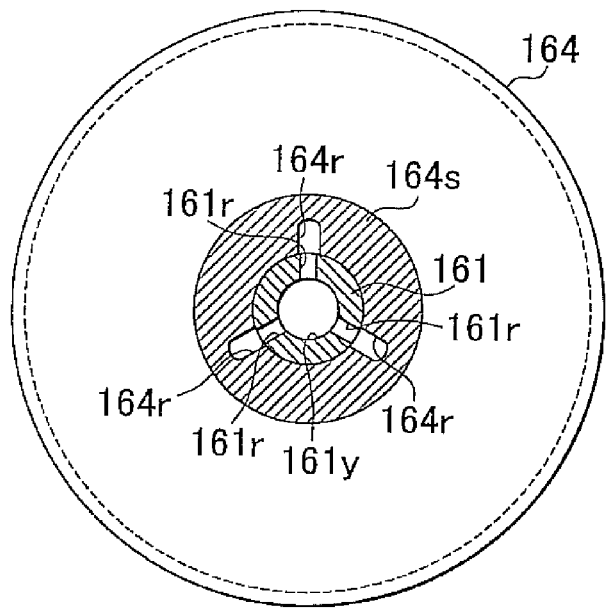
FIG. 10A is a sectional view of the continuously variable transmission taken along section C-C in FIG. 9.
Figure 10B:
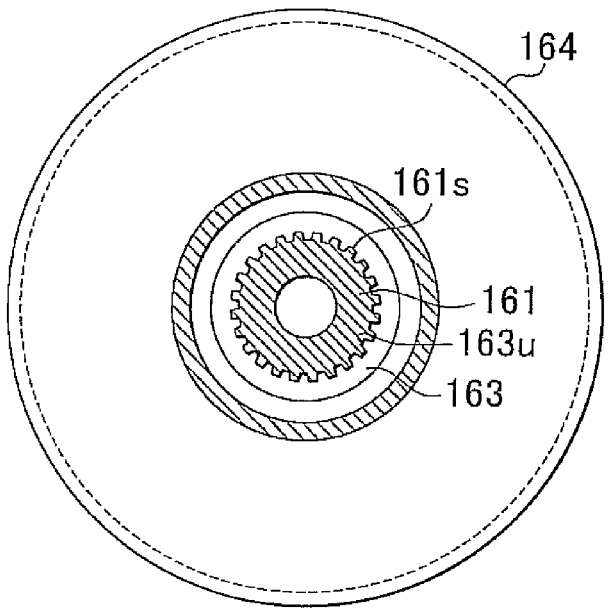
FIG. 10B is a sectional view taken along section D-D in FIG. 9.
Figure 11:
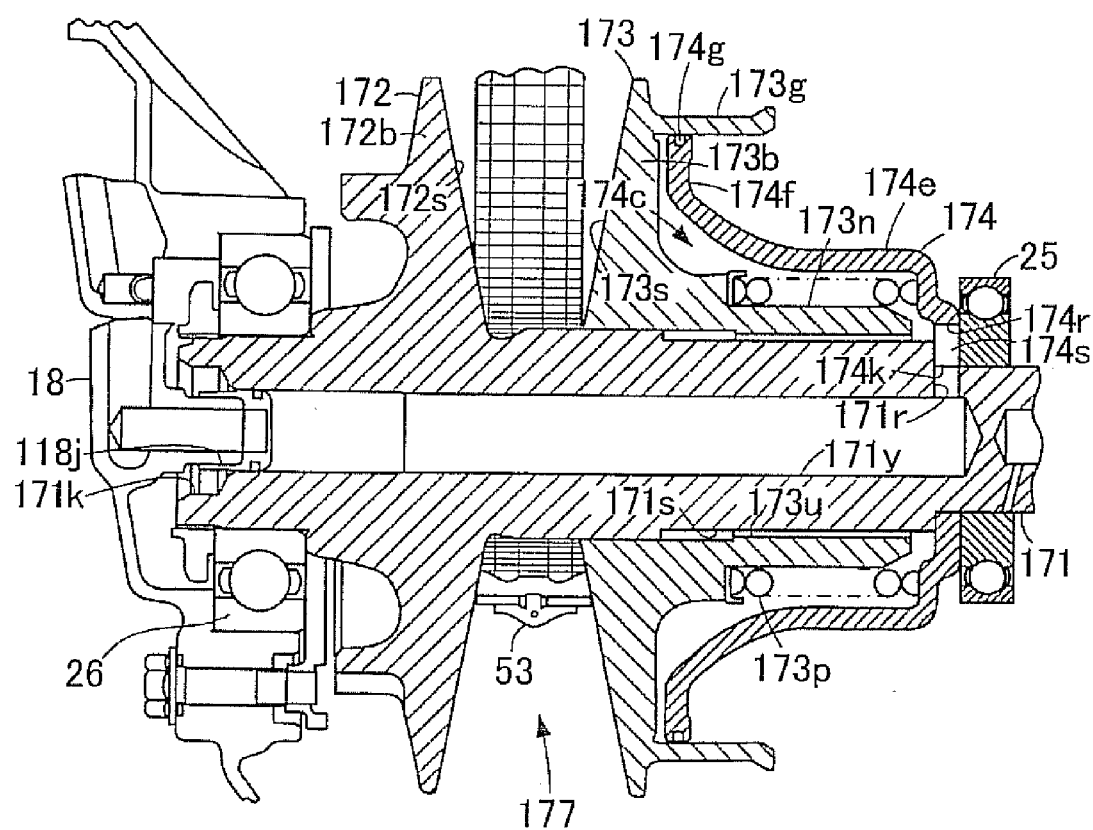
FIG. 11 is a partial enlarged sectional view of a portion of the continuously variable transmission shown in FIG. 8.

FIG. 8 is a sectional view of a continuously variable transmission according to a second example embodiment of the invention, and FIG. 9 is a partial enlarged sectional view of a portion of the continuously variable transmission shown in FIG. 8. FIG. 10A is a sectional view of the continuously variable transmission taken along section C-C in FIG. 9, and FIG. 10B is a sectional view taken along section D-D in FIG. 9. FIG. 11 is a partial enlarged sectional view of a portion of the continuously variable transmission shown in FIG. 8.

Incidentally, the continuously variable transmission 108 according to this second example embodiment has the same structure as that of the continuously variable transmission 8 according to the first example embodiment described above, with the exception of the primary pulley 51 and the secondary pulley 52 in the first example embodiment. Therefore, like structures will be described using the same reference numerals used in the first example embodiment shown in FIGS. 1 to 7, and only the differences from the first example embodiment will be described in detail.

First the structure will be described. As shown in FIG. 1, a vehicle 100 according to the second example embodiment is structured like the vehicle 1 in the first example embodiment, with the exception of the transaxle 103. The transaxle 103 is similar to the transaxle 3 in the first example embodiment, with the exception of the continuously variable transmission 108.

As shown in FIGS. 8 and 9, the continuously variable transmission 108 includes a primary pulley 151, a secondary pulley 152, and the drive belt 53.

The primary pulley 151 is formed with a so-called single piston and includes a drive shaft 161, a driving-side fixed sheave 162, a driving-side movable sheave 163, and a driving-side cylinder member 164.

The drive shaft 161 has a drive shaft internal fluid passage 161y that is open at one end portion in the axial direction. A seal member 118s provided on the transaxle rear cover 18 is inserted into the open portion 161k. Also, drive shaft internal fluid passages 161r that open at the outer peripheral surface and are communicated with the drive shaft internal fluid passage 161y are formed in three equidistant locations on the circumference of the drive shaft 161, as shown in FIG. 10A. Also, a hydraulic fluid supply passage, not shown, that is open at the outer peripheral surface and is communicated with the drive shaft internal fluid passage 161y is also formed in the drive shaft 161. Hydraulic fluid is supplied from the hydraulic fluid supply apparatus 5 into the drive shaft internal fluid passage 161y via this hydraulic fluid supply passage.

A driving-side fixed sheave 162 is integrally formed with the drive shaft 161 at the other end portion of the drive shaft 161 in the axial direction. Also, external spline teeth 161s are formed on the outer peripheral portion of the drive shaft 161, as shown in FIG. 10B. The drive shaft 161 is rotatably supported by the bearing 24 provided on the transaxle case 17 and the bearing 23 provided on the transaxle rear cover 18, both of which are shown in FIG. 1, and coupled to the carrier 46 of the forward-reverse switching mechanism 7, such that power is input to the drive shaft 161 from the forward-reverse switching mechanism 7.

The driving-side fixed sheave 162 has a belt squeezing portion 162b and a cylindrical portion 162e that forms part of the drive shaft 161, as shown in FIG. 9. The driving-side fixed sheave 162 is arranged facing the driving-side movable sheave 163 in the axial direction.

An annular pulley groove 167 that has a generally V-shaped cross-section that the drive belt 53 winds around is partially defined by a side portion 162s of the belt squeezing portion 162b that faces the driving-side movable sheave 163. This annular pulley groove 167 is supported by the bearing 24 at the cylindrical portion 162e.

The driving-side movable sheave 163 includes a belt squeezing portion 163b, and an inner cylinder portion 163n and an outer cylinder portion 163g that are formed protruding to the side opposite the pulley groove 167. The driving-side movable sheave 163 is arranged facing the driving-side fixed sheave 162 in the axial direction. The pulley groove 167 described above is partially defined by a side portion 163s of the belt squeezing portion 163b that faces the driving-side fixed sheave 162. The drive belt 53 is sandwiched between this side portion 163s and the side portion 162s of the driving-side fixed sheave 162 by a predetermined pressure.

Internal spline teeth 163u are formed on the inner cylinder portion 163n, as shown in FIG. 10B. These inner spline teeth 163u are spline-engaged with the outer spline teeth 161s of the drive shaft 161, such that the driving-side movable sheave 163 moves along the drive shaft 161, as well as rotates together with the drive shaft 161.

The driving-side cylinder member 164 has a disc-shaped side portion 164s and a cylindrical portion 164e formed protruding from the side portion 164s toward the driving-side movable sheave 163 side. A through-hole 164k is formed in the side portion 164s. The drive shaft 161 is press-fitted into this through-hole 164k, and the driving-side cylinder member 164 is fixed to the drive shaft 161 such that it rotates together with the drive shaft 161.

The cylindrical portion 164e defines an annular driving-side cylinder 164c to which hydraulic fluid is supplied by housing part of an outer cylinder portion 163g of the driving-side movable sheave 163 and covering the side portion 163f of the driving-side movable sheave 163 on the outer cylinder portion 163g side. Also, driving-side communicating fluid passages 164r that are communicated with the drive shaft internal fluid passages 161r of the driving-side cylinder 164c are formed in three equidistant locations on the circumference of the side portion 165s, as shown in FIG. 10A. One end of each of these driving-side communicating fluid passages 164r is closed off at the side surface of the bearing 23 so that hydraulic fluid does not leak out from those driving-side communicating fluid passages 164r.

The secondary pulley 152 is formed with a so-called single piston and includes a driven shaft 171 that is parallel to the drive shaft 161, a driven-side fixed sheave 172, a driven-side movable sheave 173, a driven-side cylinder member 174, and a cover member 175, as shown in FIGS. 8 and 11.

The driven shaft 171 has a driven shaft internal fluid passage 171y that is open at one end portion in the axial direction. A seal member 118j provided on the transaxle rear cover 18 is inserted into the open portion 171k. Also, driven shaft internal fluid passages 171r that are open at the outer peripheral surface and communicated with the driven shaft internal fluid passage 171y are formed in three equidistant locations on the circumference of the driven shaft 171, just like the drive shaft 161. Also, a hydraulic fluid supply passage, not shown, that is open at the outer peripheral surface and is communicated with the driven shaft internal fluid passage 171y is also formed in the driven shaft 171. Hydraulic fluid is supplied from the hydraulic fluid supply apparatus 5 to the driven shaft internal fluid passage 171y via this hydraulic fluid supply passage.

The driven-side fixed sheave 172 is integrally formed in the driven shaft 171 near the open portion 171k of the driven shaft 171. Also, external spline teeth 171s are formed on the outer peripheral portion of the driven shaft 171, just like the drive shaft 161. The driven shaft 171 is rotatably supported by the bearing 25 provided on the transaxle case 17, the bearing 26 provided on the transaxle rear cover 18, and the bearing 27 provided on the transaxle housing 16, all of which are shown in FIG. 1, such that power of the drive shaft 161 is transmitted to the driven shaft 171 via the drive belt 53.

The driven-side fixed sheave 172 has a belt squeezing portion 172b just like the driving-side fixed sheave 162, and is arranged facing the driven-side movable sheave 173 in the axial direction. An annular pulley groove 177 that has a generally V-shaped cross-section that the drive belt 53 winds around is partially defined by a side portion 172s of the belt squeezing portion 172b that faces the driven-side movable sheave 173.

The driven-side movable sheave 173 includes a belt squeezing portion 173b, and an inner cylinder portion 173n and an outer cylinder portion 173g that are formed protruding to the side opposite the pulley groove 177, just like the driving-side movable sheave 163. The driven-side movable sheave 173 is arranged facing the driven-side fixed sheave 172 in the axial direction.

The pulley groove 177 described above is partially defined by a side portion 173s of the belt squeezing portion 173b that faces the driven-side fixed sheave 172. The drive belt 53 is sandwiched between this side portion 173s and the side portion 172s of the driven-side fixed sheave 172 by a predetermined pressure.

Internal spline teeth 173u are formed on the inner cylinder portion 173n, just like the driving-side movable sheave 163. These inner spline teeth 173u are spline-engaged with the outer spline teeth 171s of the driven shaft 171, such that the driven-side movable sheave 173 moves along the driven shaft 171, as well as rotates together with the driven shaft 171.

Also, a coil spring 173p surrounds the outer periphery of the inner cylinder portion 173n and is interposed between the driven-side movable sheave 173 and the driven-side cylinder member 174. This coil spring 173p applies urging force that pushes the driven-side movable sheave 173 toward the driven-side fixed sheave 172 side.

The driven-side cylinder member 174 has a disc-shaped side portion 174s, a cylindrical portion 174e formed protruding from the side portion 174s toward the driven-side movable sheave 173 side, and a flange portion 174f that extends radially outward from the cylindrical portion 174e.

A through-hole 174k is formed in the side portion 174s. The driven shaft 171 is press-fitted into this through-hole 174k, and the driven-side cylinder member 174 is fixed to the driven shaft 171 such that it rotates together with the driven shaft 171.

The cylindrical portion 174e houses the coil spring 173p and part of the inner cylinder portion 173n of the driven-side movable sheave 173. A seal ring 174g is fitted around the outer periphery of the flange portion 174f such that when the driven-side movable sheave 173 moves, a liquid-tight seal is maintained between the inner peripheral surface of the outer cylinder portion 173g of the driven-side movable sheave 173 and the outer peripheral surface of the flange portion 174f.

An annular driven-side cylinder 174c is defined by the surface of the driven-side cylinder member 174 on the driven-side movable sheave 173 side and the surface of the driven-side movable sheave 173 on the driven-side cylinder member 174 side. Driven-side communicating fluid passages 174r that communicate the driven shaft internal fluid passages 171r of the driven shaft 171 with the driven-side cylinder 174c are formed in equidistant locations on the circumference of the driven-side cylinder member 174. Hydraulic fluid inside the driven shaft internal fluid passage 171y is supplied to this driven-side cylinder 174c from the driven shaft internal fluid passages 171r and the driven-side communicating passages 174r. One end of each of these driven-side communicating fluid passages 174r formed in the side portion 174s of this driven-side cylinder member 174 is closed off at the side surface of the bearing 25 so that hydraulic fluid does not leak out from those driven-side communicating fluid passages 174r.

Figure 12:
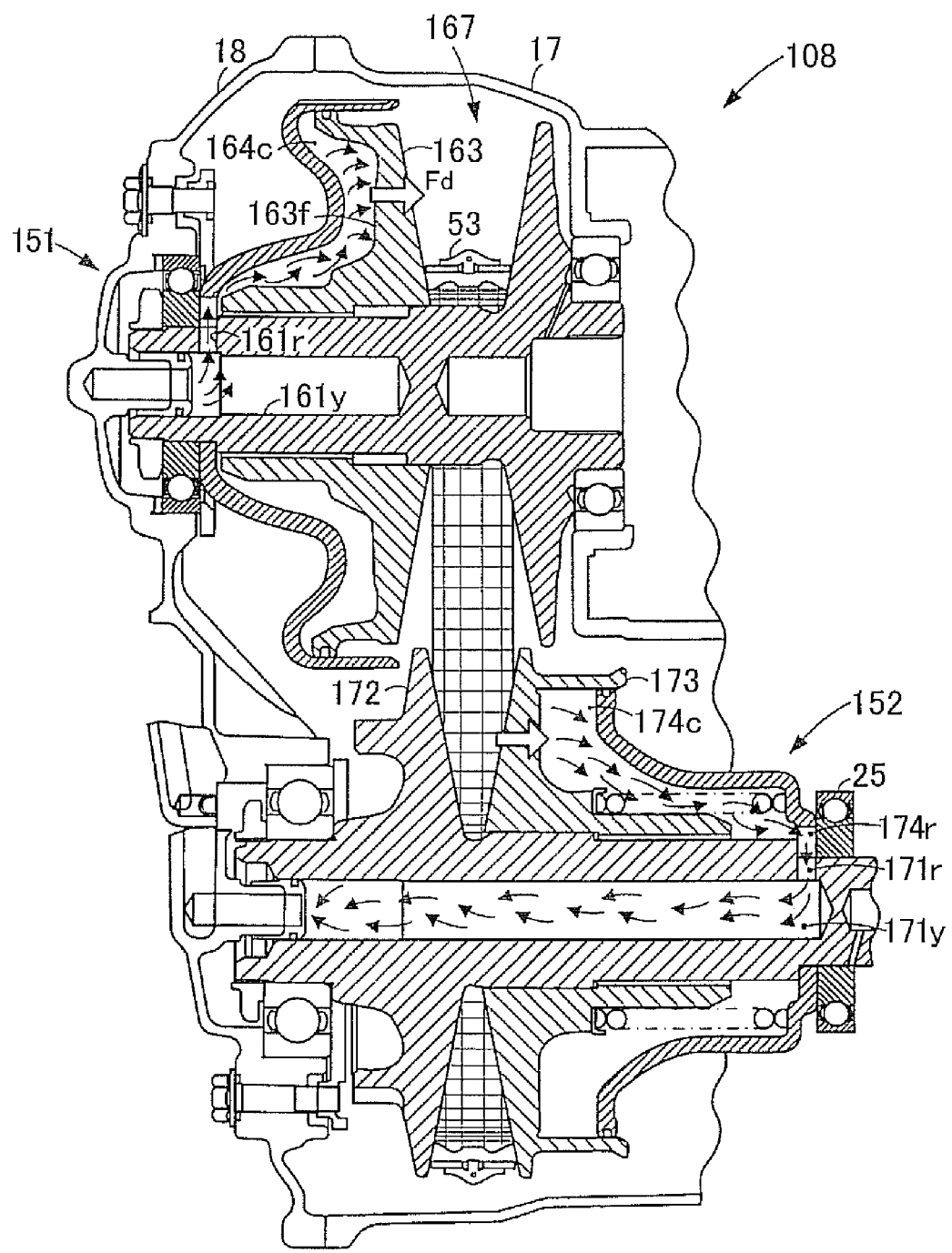
FIG. 12 is a sectional view of the continuously variable transmission according to the second example embodiment of the invention when the hydraulic fluid is supplied to the primary pulley.

Next, the operation of the continuously variable transmission 108 according to the second example embodiment will be described. FIG. 12 is a sectional view of the continuously variable transmission according to the second example embodiment when the hydraulic fluid is supplied to the primary pulley, and FIG. 13 is a sectional of the continuously variable transmission according to the second example embodiment when the hydraulic fluid is drained from the primary pulley.

The continuously variable transmission 108 according to the second example embodiment operates the same as the continuously variable transmission 108 according to the first example embodiment, with the exception of the operation of the primary pulley 151 and the secondary pulley 152.

That is, the ECU 4 controls the primary regulator valve 85, the primary shift valve 86, and the secondary shift valve 87 shown in FIG. 1 according to the operation by the driver of the vehicle 100 and the operating state of the vehicle 100, while hydraulic fluid at line pressure is supplied to those valves. As a result, hydraulic fluid at a predetermined shift pressure that has been regulated is supplied to the driving-side cylinder 164c of the primary pulley 151 and the driven-side cylinder 174c of the secondary cylinder 152, such that the power of the drive shaft 161 is output to the driven shaft 171 at a speed ratio that is appropriate for the operating state of the vehicle 100.

For example, when the vehicle 100 is accelerated, the ECU 4 performs control to establish a high speed ratio in response to the operation of an accelerator pedal, not shown. That is, the hydraulic pressure is increased to a predetermined shift pressure by the primary shift valve 86 shown in FIG. 1.

As shown in FIG. 12, the hydraulic fluid at this increased hydraulic pressure is supplied to the drive shaft internal fluid passage 161y via the fluid passage portion 83, after which it passes through the drive shaft internal fluid passages 161r and the driving-side communicating fluid passages 164r and is supplied to the driving-side cylinder 164c. At this time, the hydraulic pressure inside the driving-side cylinder 164c increases, such that hydraulic pressure is applied to the side portion 163f of the driving-side movable sheave 163 inside the driving-side cylinder 164c. As a result, pressure Fd is applied in the direction of the driving-side fixed sheave 162 to the driving-side movable sheave 163.

This pressure Fd causes the driving-side movable sheave 163 to move quickly toward the driving-side fixed sheave 162, thereby narrowing the pulley groove 167 such that the drive belt 53 slides radially outward and the belt radius on the driving side increases.

On the other hand, the ECU 4 shown in FIG. 1 opens the drain 87d of the secondary shift valve 87 and reduces the pressure in the driven-side cylinder 174c. At this time, the hydraulic fluid in the driven-side cylinder 174c drains into the fluid passage portion 83 of the hydraulic fluid supply apparatus 5 through the driven-side communicating fluid passages 174r and the driven shaft internal fluid passages 171r and 171y. Then the pressure Fd of the driving-side movable sheave 163 causes the driven-side movable sheave 173 to move away from the driven-side fixed sheave 172 such that the drive belt 53 slides radially inward and the belt radius on the driven side decreases.

As a result, the speed ratio represented by the driven-side belt radius divided by the driving-side belt radius gradually and continuously (i.e., steplessly) becomes a high speed ratio, thereby accelerating the vehicle 100.

Also, when the vehicle 100 is decelerated, the ECU 4 performs control to establish a low speed ratio. That is, the secondary shift valve 87 increases the pressure to a predetermined shift pressure, as shown in FIG. 13.

The hydraulic fluid at this increased pressure is supplied to the driven shaft internal fluid passage 171y via the fluid passage portion 83, and then supplied to the driven-side cylinder 174c through the driven shaft internal fluid passages 171r and the driven-side communicating fluid passages 174r. At this time, the pressure in the driven-side cylinder 174c increases, which increases the pressure applied to the side portion 173s of the driven-side movable sheave 173 in the driven-side cylinder 74c, such that pressure Fd is applied in the direction of the driven-side fixed sheave 172 to the driven-side movable sheave 173.

This pressure Fd causes the driven-side movable sheave 173 to quickly move toward the driven-side fixed sheave 172, thereby narrowing the pulley groove 177 such that the drive belt 53 slides radially outward and the belt radius on the driving side increases.

On the other hand, the ECU 4 shown in FIG. 1 opens the drain 86d of the primary shift valve 86 and reduces the pressure in the driving-side cylinder 164c. At this time, the hydraulic fluid in the driving-side cylinder 164c drains into the fluid passage portion 83 of the hydraulic fluid supply apparatus 5 through the driving-side communicating fluid passages 165r and the drive shaft internal fluid passages 161r and 161y. Then the pressure Fd of the driven-side movable sheave 173 causes the driving-side movable sheave 163 to move away from the driving-side fixed sheave 162 such that the drive belt 53 slides radially inward and the belt radius on the driving side decreases.

As a result, the speed ratio represented by the driven-side belt radius divided by the driving-side belt radius gradually and continuously (i.e., steplessly) becomes a low speed ratio, thereby decelerating the vehicle 100.

The continuously variable transmission 108 according to the second example embodiment is structured as described above, which enables the effects described below to be obtained. That is, the continuously variable transmission 108 according to the second example embodiment includes the primary pulley 151 that has the driving-side fixed sheave 62 that is fixed to the drive shaft 161, the driving-side movable sheave 163, and the driving-side cylinder member 164 that defines the driving-side cylinder 164c.

The continuously variable transmission 108 also includes the secondary pulley 52 that has the driven-side fixed sheave 172 that is fixed to the driven shaft 171, the driven-side movable sheave 173, and the driven-side cylinder member 174 that defines the driven-side cylinder 174c. The continuously variable transmission 108 also includes the drive belt 53.

Also, the drive shaft internal fluid passages 161y and 161r are formed in the drive shaft 161, and the driving-side communicating fluid passages 164r that communicate the driving-side cylinder 164c with the drive shaft internal fluid passages 161r are formed in the driving-side cylinder member 164.

According to this structure, hydraulic fluid supplied into the drive shaft internal fluid passage 161y is supplied to the driving-side cylinder 164c through the drive shaft internal fluid passages 161r and the driving-side communicating fluid passages 165r. Therefore, the structure is simpler than that of the related continuously variable transmission. That is, in the related continuously variable transmission, the fluid passage extending at an angle from the outer periphery toward the inner periphery of the inner cylinder portion is formed using a drilling tool from between the inner cylinder portion and the outer cylinder portion of the driving-side movable sheave. However, in the continuously variable transmission according to the second example embodiment, it is not necessary to form this kind of fluid passage, so the structure is simpler.

Also, the driving-side communicating fluid passages 165c for supplying hydraulic fluid to the driving-side cylinder 164c are formed in the driving-side cylinder member 164, as shown in FIGS. 9 and 10A, and thus provide a simple structure that is communicated with the drive shaft internal fluid passages 161r.

Also, the continuously variable transmission according to the second example embodiment improves production efficiency by reducing the trouble that it takes to form the fluid passages compared with the related continuously variable transmission. That is, in the related continuously variable transmission, the drilling tool is set between the inner cylinder portion and the outer cylinder portion of the driving-side movable sheave and the fluid passage is formed at an angle from the outer periphery of the inner cylinder portion toward the inner periphery of the inner cylinder portion. However, in the continuously variable transmission according to the second example embodiment, it is not necessary to form this kind of fluid passage, so forming the fluid passage is less troublesome.

Further, the driving-side communicating fluid passages 165r can be easily formed in the driving-side cylinder member 164 at the same time the through-hole 164k is formed in the driving-side cylinder member 164, in a single press-forming process using a hole-making machine such as a punch press. In addition, burrs formed in the through-hole 164k and the driving-side communicating fluid passages 165r can be removed at the same time in a single process. As a result, no special forming process is needed to form the driving-side communicating fluid passages 165r, so forming the fluid passages is less troublesome.

Also, removing the burrs from deep inside the drive shaft internal fluid passage where they are hard to reach, which is where they form in the related art, is troublesome. However, in the continuously variable transmission according to the second example embodiment, burrs in the driving-side communicating passages 165r are exposed to the outside and therefore can be easily removed, which makes forming the fluid passages less troublesome.

Figure 14:
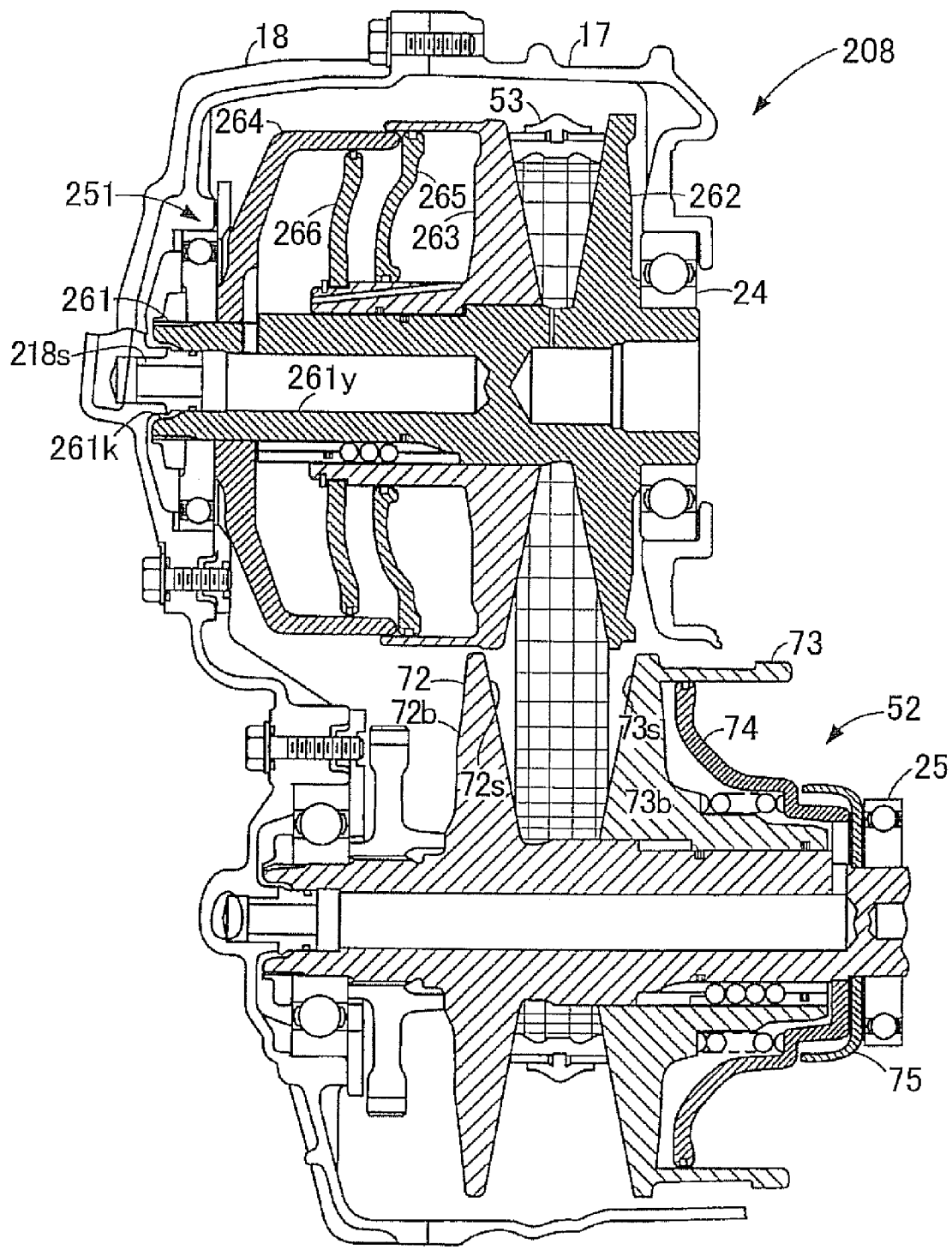
FIG. 14 is a sectional view of a continuously variable transmission according to a third example embodiment of the invention.
Figure 15:
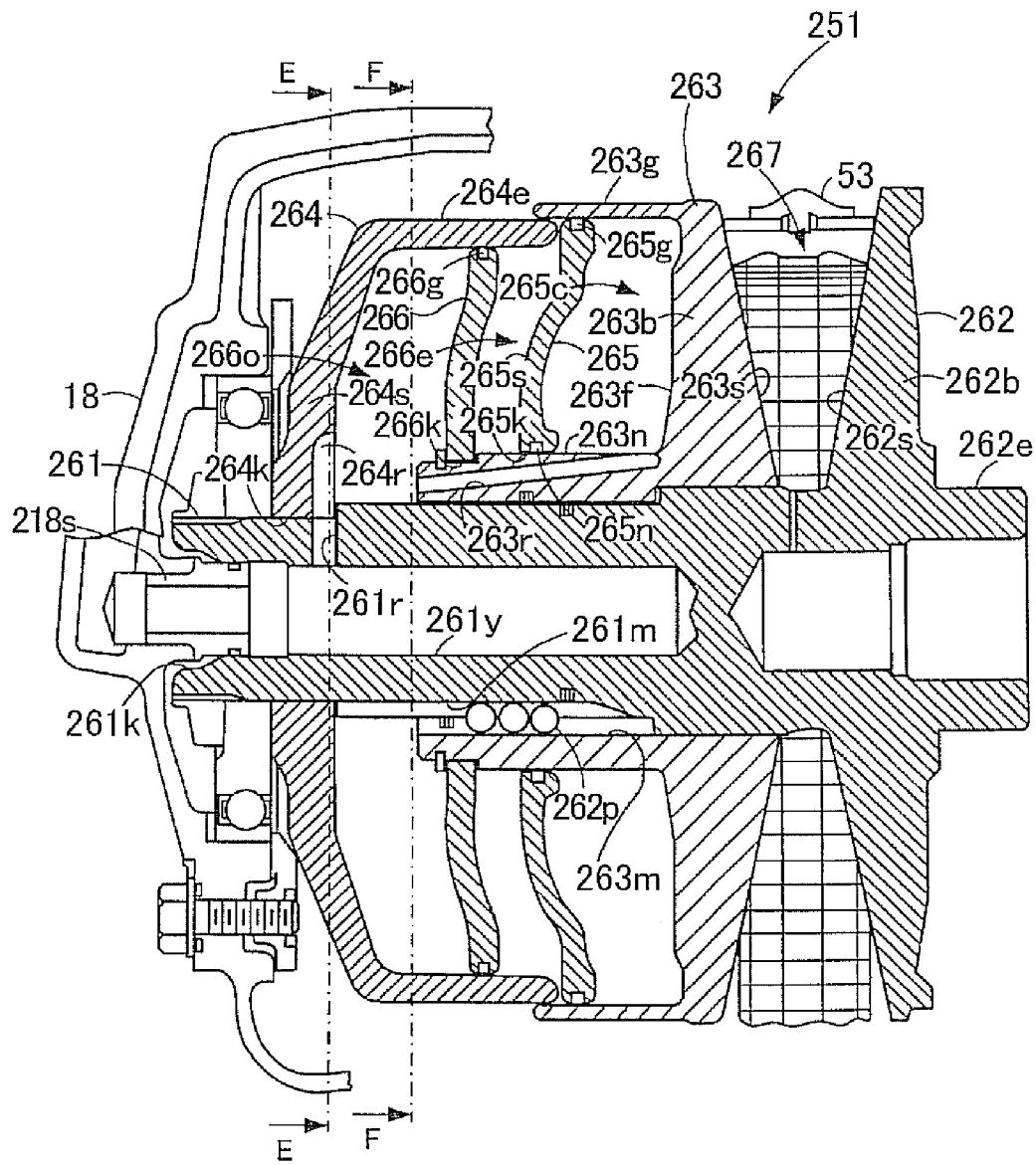
FIG. 15 is a partial enlarged sectional view of a portion of the continuously variable transmission shown in FIG. 14.
Figure 16A:
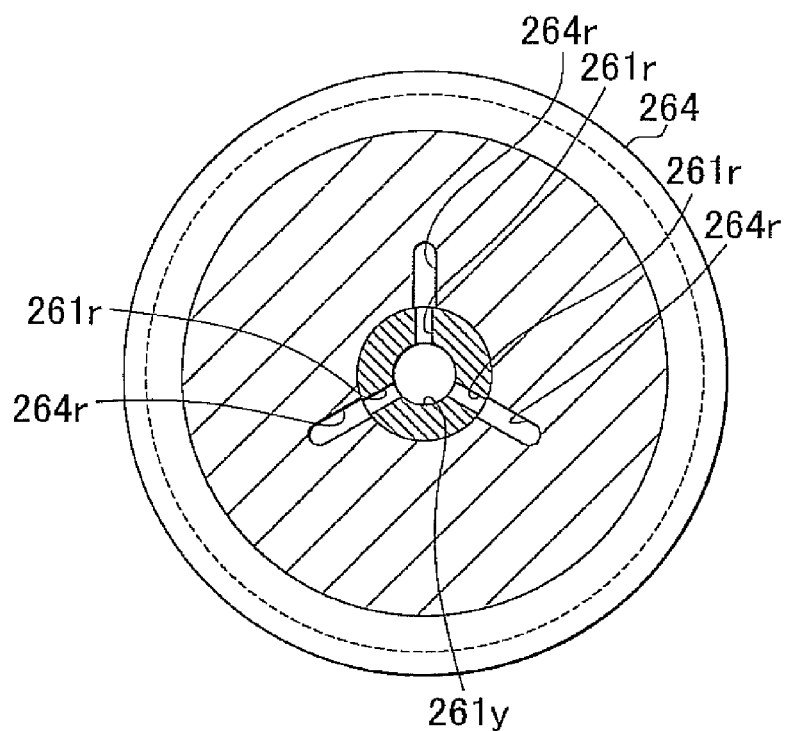
FIG. 16A is a sectional view taken along section E-E in FIG. 15.
Figure 16B:
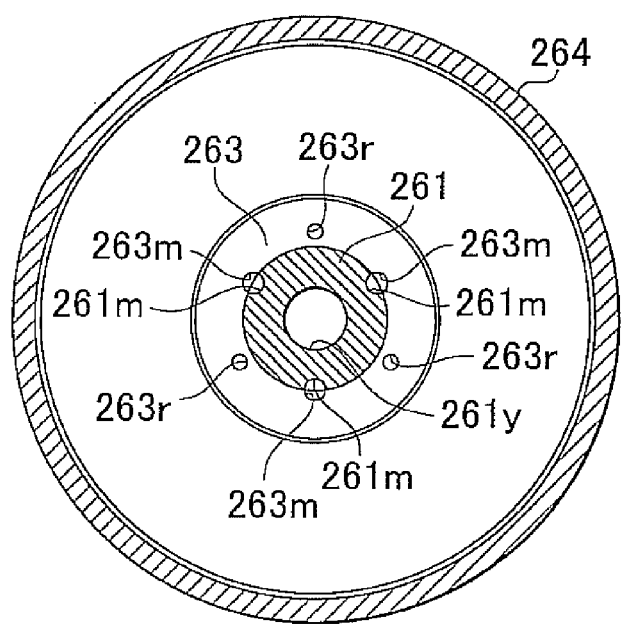
FIG. 16B is a sectional view taken along section F-F in FIG. 15.

FIG. 14 is a sectional view of a continuously variable transmission according to a third example embodiment of the invention. FIG. 15 is a partial enlarged sectional view of a portion of the continuously variable transmission shown in FIG. 14. FIG. 16A is a sectional view taken along section E-E in FIG. 15, and FIG. 16B is a sectional view taken along section F-F in FIG. 15.

Incidentally, the continuously variable transmission 208 according to this third example embodiment has the same structure as that of the continuously variable transmission 8 according to the first example embodiment described above, with the exception of the primary pulley 51 in the first example embodiment. Therefore, like structures will be described using the same reference numerals used in the first example embodiment shown in FIGS. 1 to 7, and only the differences from the first example embodiment will be described in detail.

First the structure will be described. As shown in FIG. 1, a vehicle 200 according to the third example embodiment is structured like the vehicle 1 in the first example embodiment, with the exception of the transaxle 203. The transaxle 203 is similar to the transaxle 3 in the first example embodiment, with the exception of the continuously variable transmission 208.

As shown in FIGS. 14 and 15, the continuously variable transmission 208 includes a primary pulley 251, a secondary pulley 252, and the drive belt 53.

The primary pulley 251 is formed with a so-called double piston and includes a drive shaft 261, a driving-side fixed sheave 262, a driving-side movable sheave 263, a driving-side cylinder member 264, a partition wall member 265, and a pressing member 266.

The drive shaft 261 has a drive shaft internal fluid passage 261y that is open at one end portion in the axial direction. A seal member 218s provided on the transaxle rear cover 18 is inserted into the open portion 261k.

Also, drive shaft internal fluid passages 261r that open at the outer peripheral surface and are communicated with the drive shaft internal fluid passage 261y are formed in three equidistant locations on the circumference of the drive shaft 261, as shown in FIG. 16A. Also, a hydraulic fluid supply passage, not shown, that is open at the outer peripheral surface and is communicated with the drive shaft internal fluid passage 261y is also formed in the drive shaft 261. Hydraulic fluid is supplied from the hydraulic fluid supply apparatus 5 into the drive shaft internal fluid passage 261y via this hydraulic fluid supply passage.

A driving-side fixed sheave 262 is integrally formed with the drive shaft 261 at the other end portion of the drive shaft 261 in the axial direction. Also, ball spline grooves 261m are formed in three equidistant locations on the circumference of the outer peripheral portion of the drive shaft 261, as shown in FIG. 16B.

The drive shaft 261 is rotatably supported by a bearing 24 provided on the transaxle case 17 and a bearing 23 provided on the transaxle rear cover 18, both of which are shown in FIG. 1, and coupled to the carrier 46 of the forward-reverse switching mechanism 7, such that power is input to the drive shaft 261 from the forward-reverse switching mechanism 7.

The driving-side fixed sheave 262 has a belt squeezing portion 262b and a cylindrical portion 262e that forms part of the drive shaft 261, as shown in FIG. 15. The driving-side fixed sheave 262 is arranged facing the driving-side movable sheave 263 in the axial direction. An annular pulley groove 267 that has a generally V-shaped cross-section that the drive belt 53 winds around is partially defined by a side portion 262s of the belt squeezing portion 262b that faces the driving-side movable sheave 263. This annular pulley groove 267 is supported by the bearing 24 at the cylindrical portion 262e.

The driving-side movable sheave 263 includes a belt squeezing portion 263b, and an inner cylinder portion 263n and an outer cylinder portion 263g that are formed protruding to the side opposite the pulley groove 267. The driving-side movable sheave 263 is arranged facing the driving-side fixed sheave 262 in the axial direction. The pulley groove 267 described above is partially defined by a side portion 263s of the belt squeezing portion 263b that faces the driving-side fixed sheave 262. The drive belt 53 is sandwiched between this side portion 263s and the side portion 262s of the driving-side fixed sheave 262 by a predetermined pressure.

Also, driving-side communicating fluid passages (i.e., inner cylinder portion communicating fluid passages) 263r for supplying hydraulic fluid are formed in three equidistant locations on the circumference of the inner cylinder portion 263 extending from the end surface of the inner cylinder portion 263n in the axial direction thereof and opening at the outer peripheral surface of the inner cylinder portion 263n that is near the side portion 263s, as shown in FIGS. 15 and 16B. Also, ball spline grooves 263m are formed in three equidistant locations in the inner cylinder portion 263n.

Also, ball splines 262p are interposed between these ball spline grooves 263m and the ball spline grooves 261m of the drive shaft 261, as shown in FIG. 15, such that the driving-side movable sheave 263 moves smoothly in the axial direction, as well as rotates together with the drive shaft 261.

The driving-side cylinder member 264 has a disc-shaped side portion 264s and a cylindrical portion 264e formed protruding from the side portion 264s toward the driving-side movable sheave 263 side. A through-hole 264k is formed in the side portion 264s. The drive shaft 261 is press-fitted into this through-hole 264k, and the driving-side cylinder member 264 is fixed to the drive shaft 261 such that it rotates together with the drive shaft 261. Part of the cylindrical portion 264e is housed in an outer cylinder portion 263g of the driving-side movable sheave 263, such that the driving-side movable sheave 263 moves around the outer peripheral side of the outer cylinder portion 264e.

Also, driving-side communicating fluid passages 264r formed by grooves of a predetermined depth and length are formed in three equidistant locations on the circumference of the side portion 264s that is on the driving-side movable sheave 263 side, as shown in FIGS. 15 and 16A.

The partition wall member 265 has a disc-shaped side portion 265s. A through-hole 265k is formed in this side portion 265s, and the inner cylinder portion 263n of the driving-side movable sheave 263 is slidably inserted into this through-hole 265k.

A seal ring 265g is fitted around the outer periphery of the side portion 265s such that when the driving-side movable sheave 263 moves, a liquid-tight seal is maintained between the inner peripheral surface of the outer cylinder portion 263g of the driving-side movable sheave 263 and the outer peripheral surface of the side portion 265s. Also, a seal ring 265n is fitted on the inner periphery surrounding the through hole 265k of this side portion 265s such that when the driving-side movable sheave 263 moves, a liquid-tight seal is maintained between the outer peripheral surface of the inner cylinder portion 263n of the driving-side movable sheave 263 and the inner peripheral surface of the side portion 265s.

An annular sheave-side cylinder 265c is defined by the surface of this partition wall member 265 on the driving-side movable sheave 263 side, the surface of the driving-side movable sheave 263 on the partition wall member 265 side, and the outer peripheral surface of the inner cylinder portion 263n of the driving-side movable sheave 263. Hydraulic fluid inside the drive shaft internal fluid passage 261y is supplied to this sheave-side cylinder 265c through the drive shaft internal fluid passages 261r, the driving-side communicating fluid passages 264r, and the driving-side communicating fluid passages 263r.

The pressing member 266 is formed in a disc shape with a through-hole 266k that extends in the axial direction formed in it. The cylindrical portion 263n is press-fitted into this through-hole 266k, and the pressing member is fixed to the driving-side movable sheave 263 such that it rotates together with the driving-side movable sheave 263.

A seal ring 266g is fitted on the outer periphery of the pressing member 266 such that when the pressing member 266 moves together with the driving-side movable sheave 263, a liquid-tight seal is maintained between the outer peripheral surface of the pressing member 266 and the inner peripheral surface of the cylindrical portion 264e of the driving-side cylinder member 264.

An annular member-side air cylinder 266e is defined by the surface of this pressing member 266 on the partition wall member 265 side, the surface of the partition wall member 265 on the pressing member 266 side, the outer peripheral surface of the inner cylinder portion 263n of the driving-side movable sheave 263, and the inner peripheral surface of the cylindrical portion 264e of the driving-side cylinder member 264. Also, an annular member-side hydraulic cylinder 266o is defined by the surface of the pressing member 266 on the driving-side cylinder member 264 side, the surface of the driving-side cylinder member 264 on the pressing member 266 side, the inner peripheral surface of the cylindrical portion 264e of the driving-side cylinder member 264, and the outer peripheral surface of the drive shaft 261.

Hydraulic fluid inside the drive shaft internal fluid passage 261y is supplied to this member-side hydraulic cylinder 266o from the drive shaft internal fluid passages 261r and the driving-side communicating fluid passages 264r. Incidentally, this member-side hydraulic cylinder 266o and the member-side air cylinder 266e are each examples of a member-side cylinder of the invention.

Next, the operation of the continuously variable transmission 208 according to the third example embodiment will be described.

Figure 17:
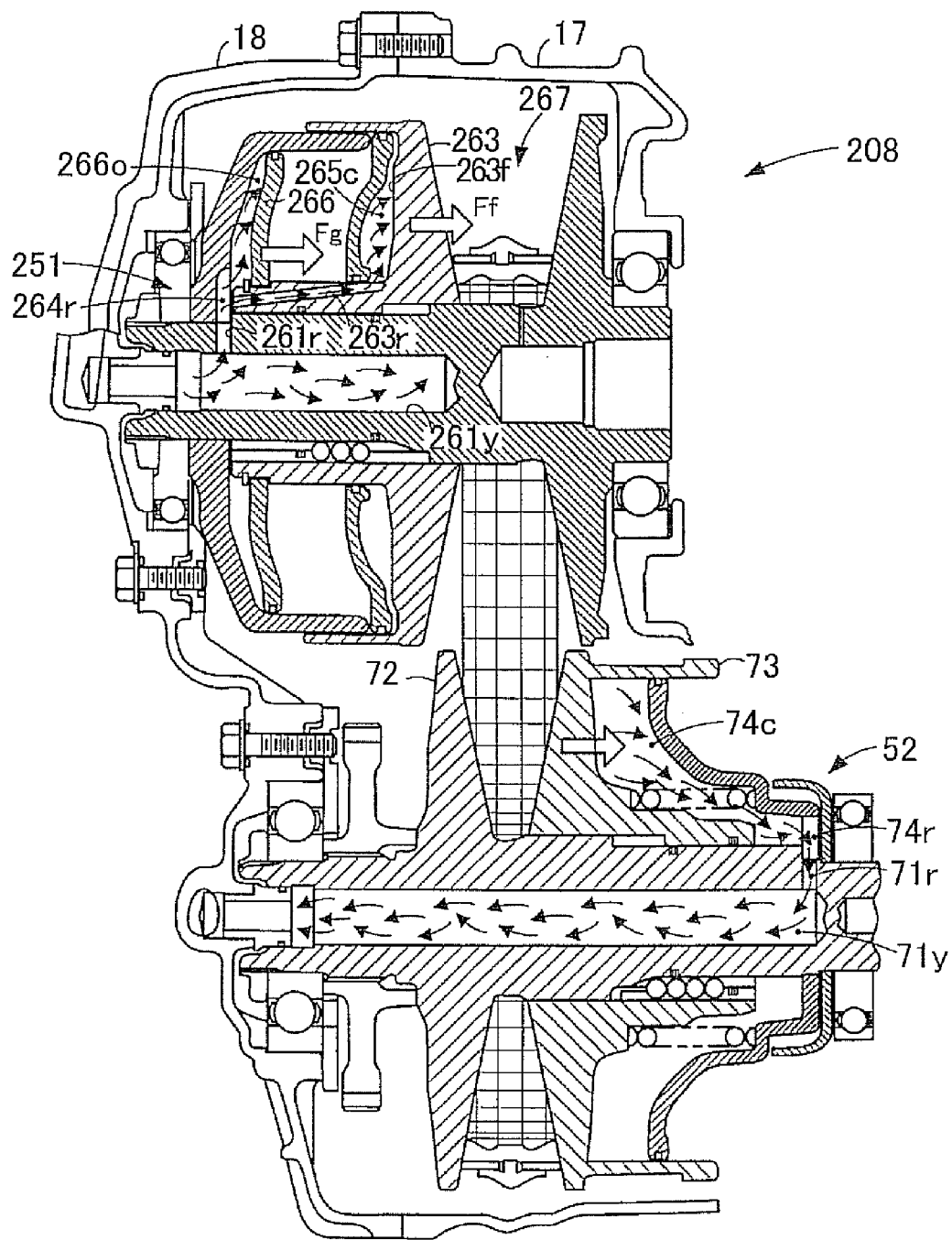
FIG. 17 is a sectional view of the continuously variable transmission according to the third example embodiment of the invention.
Figure 18:
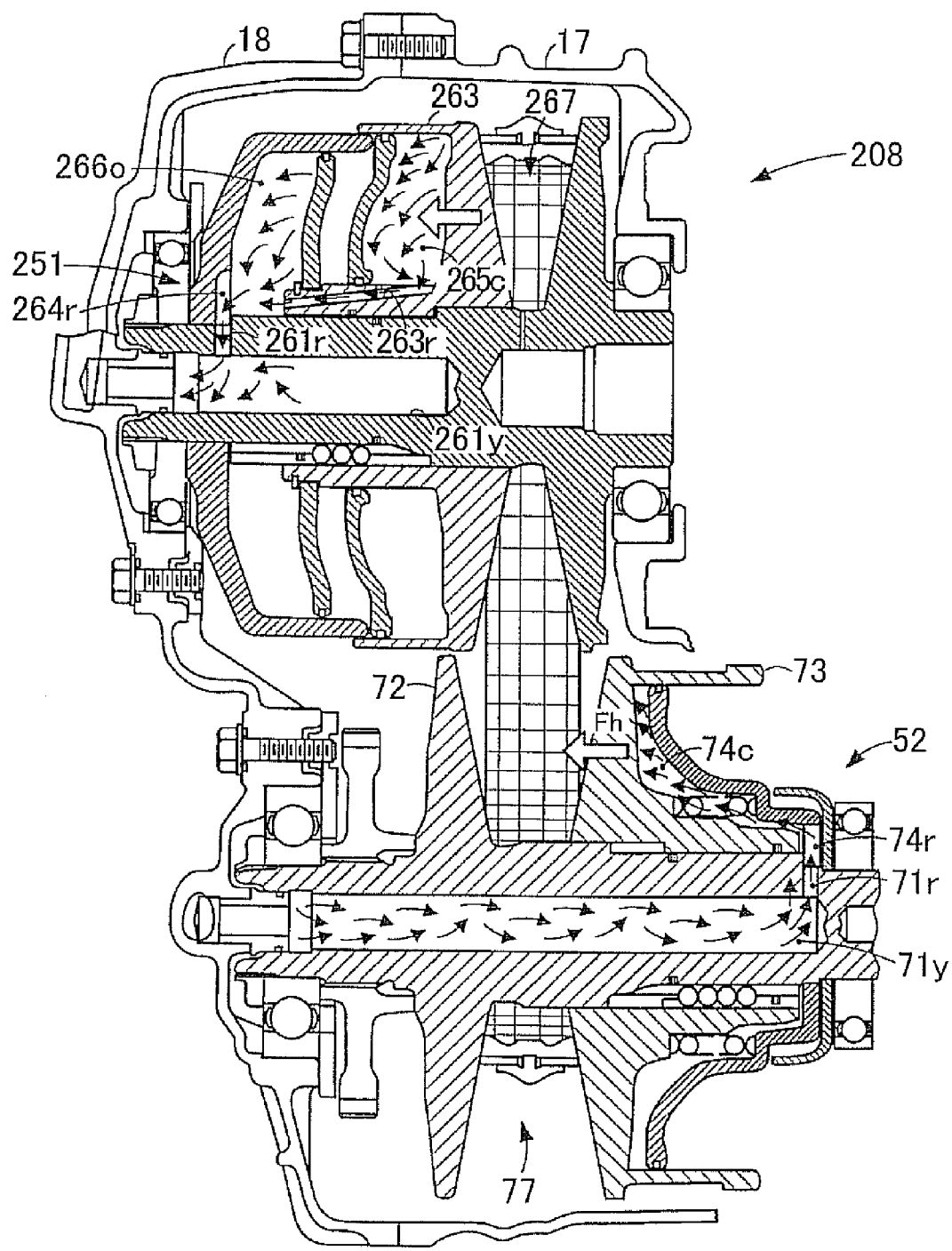
FIG. 18 is a sectional view of the continuously variable transmission according to the third example embodiment of the invention when hydraulic fluid is drained from the primary pulley.

FIG. 17 is a sectional view of the continuously variable transmission according to the third example embodiment, FIG. 18 is a sectional view of the continuously variable transmission according to the third example embodiment when hydraulic fluid is drained from the primary pulley.

The continuously variable transmission 208 according to the third example embodiment operates the same as the continuously variable transmission 8 according to the first example embodiment, with the exception of the operation of the primary pulley 251.

That is, the ECU 4 controls the primary regulator valve 85, the primary shift valve 86, and the secondary shift valve 87 shown in FIG. 1 according to an operation of the driver of the vehicle 200 and the operating state of the vehicle 200, while hydraulic fluid at line pressure is supplied to those valves. As a result, hydraulic fluid at a predetermined shift pressure that has been regulated is supplied to the sheave-side cylinder 265c and the member-side hydraulic cylinder 266o of the primary pulley 251 and the driven-side cylinder 74c of the secondary pulley 52, such that the power of the drive shaft 261 is output to the driven shaft 71 at a speed ratio appropriate for the operating state of the vehicle 200.

For example, when the vehicle 200 is accelerated, the ECU 4 performs control to establish a high speed ratio in response to the operation of an accelerator pedal, not shown. That is, the hydraulic pressure is increased to a predetermined shift pressure by the primary shift valve 86 shown in FIG. 1.

As shown in FIG. 17, the hydraulic fluid at this increased hydraulic pressure is supplied to the drive shaft internal fluid passage 261y via the fluid passage portion 83, and is then supplied into the member-side hydraulic cylinder 266o through the drive shaft internal fluid passages 261r and the driving-side communicating fluid passages 264r. Furthermore, the hydraulic fluid is supplied to the sheave-side cylinder 265c through the driving-side communicating fluid passages 263r. At this time, the hydraulic pressure inside the member-side hydraulic cylinder 266o increases the hydraulic pressure applied to the pressing member 266, such that pressure is applied in the direction of the driving-side fixed sheave 262 to the pressing member 266. As a result, the pressing member 266 in turn applies pressure Fg in the direction of the driving-side fixed sheave 262 to the driving-side movable sheave 263 at the inner cylinder portion 263n.

Also, the hydraulic pressure inside the sheave-side cylinder 265c increases, such that hydraulic pressure is applied to the side portion 263f of the driving-side movable sheave 263 inside the sheave-side cylinder 265c. As a result, pressure Ff is applied in the direction of the driving-side fixed sheave 262 to the driving-side movable sheave 263. These pressures Fg and Ff cause the driving-side movable sheave 263 to move quickly toward the driving-side fixed sheave 262, thereby narrowing the pulley groove 267 such that the drive belt 53 slides radially outward and the belt radius on the driving side increases.

On the other hand, the ECU 4 shown in FIG. 1 opens the drain 87d of the secondary shift valve 87 and reduces the pressure in the driven-side cylinder 274c. At this time, the hydraulic fluid in the driven-side cylinder 74c drains into the fluid passage portion 83 of the hydraulic fluid supply apparatus 5 through the driven-side communicating fluid passages 74r and the driven shaft internal fluid passages 71r and 71y. Then the pressures Ff and Fg of the driving-side movable sheave 263 cause the driven-side movable sheave 73 to move away from the driven-side fixed sheave 72 such that the drive belt 53 slides radially inward and the belt radius on the driven side decreases.

As a result, the speed ratio represented by the driven-side belt radius divided by the driving-side belt radius gradually and continuously (i.e., steplessly) becomes a high speed ratio, thereby accelerating the vehicle 200.

Also, when the vehicle 200 is decelerated, the ECU 4 performs control to establish a low speed ratio. That is, the secondary shift valve 87 increases the pressure to a predetermined shift pressure, as shown in FIG. 13. The hydraulic fluid at this increased pressure is supplied to the driven shaft internal fluid passage 71y via the fluid passage portion 83, and then supplied to the driven-side cylinder 74c through the driven shaft internal fluid passages 71r and the driven-side communicating fluid passages 74r. At this time, the pressure in the driven-side cylinder 74c increases, which increases the pressure applied to the side portion 73s of the driven-side movable sheave 73 in the driven-side cylinder 74c, such that pressure Fh is applied in the direction of the driven-side fixed sheave 72 to the driven-side movable sheave 73.

This pressure Fh causes the driven-side movable sheave 73 to quickly move toward the driven-side fixed sheave 72, thereby narrowing the pulley groove 77 such that the drive belt 53 slides radially outward and the belt radius on the driving side increases.

On the other hand, the ECU 4 shown in FIG. 1 opens the drain 86d of the primary shift valve 86 and reduces the pressure in the sheave-side cylinder 265c and the member-side hydraulic cylinder 266o. At this time, the hydraulic fluid in the driving-side cylinder 264c drains into the fluid passage portion 83 of the hydraulic fluid supply apparatus 5 through the driving-side communicating fluid passages 265r and 263r, and the drive shaft internal fluid passages 261r and 261y. Then the pressure Fh of the driven-side movable sheave 73 causes the driving-side movable sheave 263 to move away from the driving-side fixed sheave 262 such that the drive belt 53 slides radially inward and the belt radius on the driving side decreases.

As a result, the speed ratio represented by the driven-side belt radius divided by the driving-side belt radius gradually and continuously (i.e., steplessly) becomes a low speed ratio, thereby decelerating the vehicle 200.

The continuously variable transmission 208 according to the third example embodiment is structured as described above, which enables the effects described below to be obtained. That is, the continuously variable transmission 208 according to the third example embodiment includes the primary pulley 251 that has the driving-side fixed sheave 262 that is fixed to the drive shaft 261, the driving-side movable sheave 263, and the driving-side cylinder member 264.

Further, the continuously variable transmission 208 also includes the secondary pulley 52 that has the driven-side fixed sheave 72 that is fixed to the driven shaft 71, the driven-side movable sheave 73, and the driven-side cylinder member 74 that defines the driven-side cylinder 74c. The continuously variable transmission 208 also includes the drive belt 53. Moreover, the drive shaft internal fluid passages 261y and 261r are formed in the drive shaft 261, and the driving-side communicating fluid passages 264r that communicate the member-side hydraulic cylinder 266o with the sheave-side cylinder 265c are formed in the driving-side cylinder member 264.

According to this structure, hydraulic fluid that is supplied to the drive shaft internal fluid passage 261y is supplied to the member-side hydraulic cylinder 266o and the sheave-side cylinder 266c through the drive shaft internal fluid passages 261r and the driving-side communicating fluid passages 265r and 263r. Therefore, the structure is simpler than that of the related continuously variable transmission.

That is, in the related continuously variable transmission, the fluid passage extending at an angle from the outer periphery toward the inner periphery of the inner cylinder portion is formed using a drilling tool from between the inner cylinder portion and the outer cylinder portion of the driving-side movable sheave. However, in the continuously variable transmission according to the third example embodiment, the driving-side communicating fluid passages 263r for supplying hydraulic fluid are formed extending from the end surface of the inner cylinder portion 263n in the axial direction thereof and opening at the outer peripheral surface of the inner cylinder portion 263n that is near the side portion 263s. As a result, it is not necessary to form a fluid passage that is communicated with the drive shaft internal fluid passages, so the structure is simpler.

Also, the driving-side communicating fluid passages 265c for supplying hydraulic fluid to the member-side hydraulic cylinder 266o are formed in the driving-side cylinder member 264, as shown in FIGS. 15 and 16A, and thus provide a simple structure that is communicated with the drive shaft internal fluid passages 261r.

Also, the continuously variable transmission according to the third example embodiment improves production efficiency by reducing the trouble that it takes to form the fluid passages compared with the related continuously variable transmission.

That is, in the related continuously variable transmission, the drilling tool is set between the inner cylinder portion and the outer cylinder portion of the driving-side movable sheave and the fluid passage is formed at an angle from the outer periphery of the inner cylinder portion toward the inner periphery of the inner cylinder portion. However, in the continuously variable transmission according to the third example embodiment, the driving-side communicating fluid passages 263r for supplying hydraulic fluid are formed extending from the end surface of the inner cylinder portion 263n in the axial direction thereof and opening at the outer peripheral surface of the inner cylinder portion 263n that is near the side portion 263s. As a result, the burrs are exposed to the outside so they are easy to remove, which makes forming the fluid passages less troublesome.

In the continuously variable transmissions 8, 108, and 208 according to the first, second, and third example embodiments, respectively, the driving-side communicating fluid passages 65r, 164r, and 264r, and the drive shaft internal fluid passages 61r, 161r, and 261r are each formed in three equidistant locations on the circumference. Alternatively, however, in the continuously variable transmission of the invention, the driving-side communicating fluid passages and the drive shaft internal fluid passages may each be formed in one or two locations, or four or more locations.

Figure 19A:
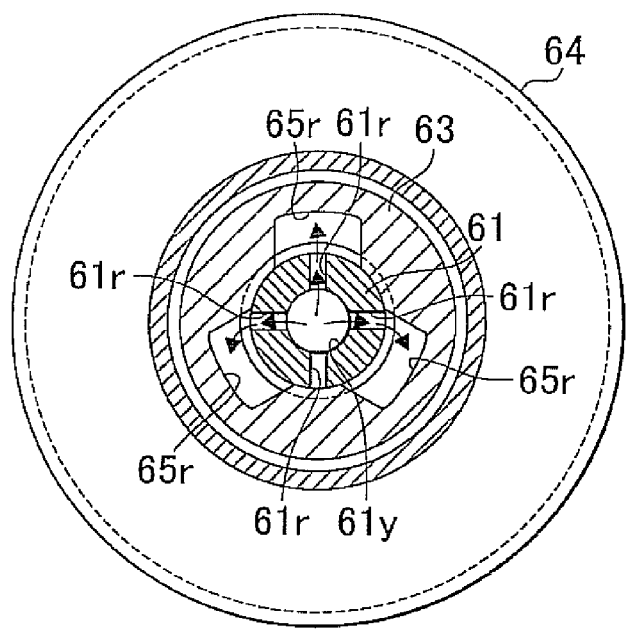
FIG. 19A is a sectional view of the continuously variable transmission according to a modified example of the first example embodiment of the invention when three driving-side communicating fluid passages are communicated with three drive shaft internal fluid passages.

For example, as shown in FIG. 19A, in the continuously variable transmission 8, wide driving-side communicating fluid passages 65r may be formed in three equidistant locations on the circumference of the side portion 65s of the partition wall member 65 shown in FIG. 3, and the drive shaft internal fluid passages 61r may be formed in four equidistant locations on the circumference of the drive shaft 61. In this case, when press-fitting the drive shaft 61 into the partition wall member 65 and fixing the two together, there is no need to position them so that the driving-side communicating fluid passages 65r are communicated with the drive shaft internal fluid passages 61r. That is, as shown in FIG. 19A, the drive shaft internal fluid passages 61r are formed in four equidistant locations on the circumference of the drive shaft 61. Therefore, the three driving-side communicating fluid passages 65r are communicated with three of the drive shaft internal fluid passages 61r, so hydraulic fluid can be supplied from three locations.

Figure 19B:
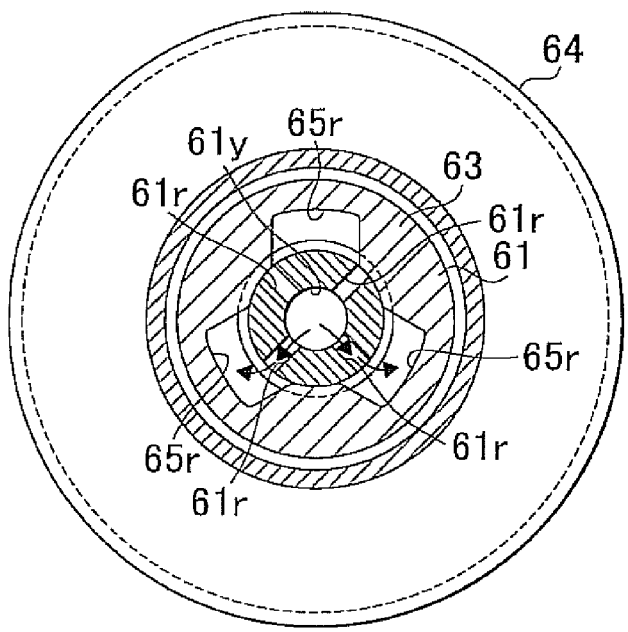
FIG. 19B is a sectional view of the continuously variable transmission according to the modified example of the first example embodiment of the invention when two driving-side communicating fluid passages are communicated with two drive shaft internal fluid passages.

On the other hand, as shown in FIG. 19B, from the positional relationship between the driving-side communicating fluid passages 65r and the drive shaft internal fluid passages 61r shown in FIG. 19A, even if the partition wall member 65 and the drive shaft 61 are fixed offset by 45 degrees, two of the driving-side communicating fluid passages 65r will still be communicated with two of the drive shaft internal fluid passages 61r, so hydraulic fluid can still be supplied from two locations. That is, regardless of the positional relationship between the driving-side communicating fluid passages 65r and the drive shaft internal fluid passages 61r, at least two of the driving-side communicating fluid passages 65r will be connected to two drive shaft internal fluid passages 61r, so hydraulic fluid will be able to be supplied from at least two locations. As a result, when fixing the partition wall member 65 and the drive shaft 61, there is no need to match the phases of the fluid passages by positioning the partition wall member 65 and the drive shaft 61, which improves assemblability.

Also, further increasing the number of the driving-side communicating fluid passages 65r and drive shaft internal fluid passages 61r to more than that shown in FIG. 19A increases the passages for supplying hydraulic fluid from the drive shaft internal fluid passages 61r to the driving-side communicating fluid passages 65r, such that hydraulic fluid can be supplied even faster to the sheave-side cylinder 65c and the member-side hydraulic cylinder 66o shown in FIG. 3, which further improves the hydraulic pressure response.

Also, in the continuously variable transmissions 8, 108, and 208 according to the first, second, and third example embodiments, respectively, form part of the transaxles 3, 103, and 203, respectively. Alternatively, however, the continuously variable transmission of the invention may form a transmission that is not part of a transaxle. For example, the continuously variable transmission of the invention may simply form a transmission.

As described above, the invention is able to provide a continuously variable transmission that enables production efficiency to be improved by forming a fluid passage that communicates a cylinder to which hydraulic fluid is supplied with a fluid passage formed in a drive shaft with a simple structure, and therefore reducing the trouble of forming the fluid passage. In particular, the invention is useful for a continuously variable transmission that changes speed ratios using hydraulic pressure.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single elements, are also within the scope of the invention.

What is claimed is:

1. A continuously variable transmission comprising:
a primary pulley that includes a driving-side fixed sheave that is fixed to a drive shaft, a driving-side movable sheave that faces the driving-side fixed sheave in the axial direction and is provided on the drive shaft so as to be able to move in the axial direction, and a driving-side cylinder member that covers the side surface of the driving-side movable sheave on the side opposite the side of the driving-side fixed sheave, the driving-side cylinder member is fixed to the drive shaft, and the driving-side cylinder member defines a driving-side cylinder to which hydraulic fluid is supplied;
a secondary pulley that includes a driven-side fixed sheave that is fixed to a driven shaft that is parallel to the drive shaft, a driven-side movable sheave that faces the driven-side fixed sheave in the axial direction and is provided on the driven shaft so as to be able to move in the axial direction, and a driven-side cylinder member that covers the side surface of the driven-side movable sheave on the side opposite the side of the driven-side fixed sheave, the driven-side cylinder member is fixed to the driven shaft, and the driven-side cylinder member defines a driven-side cylinder to which hydraulic fluid is supplied; and
a drive belt that is wound around the primary pulley and the secondary pulley,
wherein the driven shaft has a driven shaft internal fluid passage that opens at the outer peripheral surface of the driven shaft to supply hydraulic fluid into the driven-side cylinder,
the driven-side cylinder member has a driven-side communicating fluid passage that communicates the driven shaft internal fluid passage with the driven-side cylinder,
the drive shaft has a drive shaft internal fluid passage that opens at the outer peripheral surface of the drive shaft to supply hydraulic fluid into the driving-side cylinder,
wherein the driving-side cylinder member includes i) a partition wall member that is fixed to the drive shaft and divides the driving-side cylinder into a sheave-side cylinder defined by the driving-side movable sheave and a member-side cylinder defined by the driving-side cylinder member, and ii) a pressing member that divides the member-side cylinder into a member-side hydraulic cylinder defined by the driving-side cylinder member and a member-side air cylinder defined by the partition wall member inside the member-side cylinder, the pressing member is supported by the partition wall member and the driving-side cylinder member so as to be able to move in the axial direction, and the pressing member pushes the driving-side movable sheave in the axial direction using hydraulic pressure in the member-side hydraulic cylinder; and
the partition wall member has a driving-side communicating fluid passage that communicates the member-side hydraulic cylinder, the sheave-side cylinder, and the drive shaft internal fluid passage together.

2. The continuously variable transmission according to claim 1, wherein the driving-side communicating fluid passage is formed in plurality at equidistant locations on the circumference of the partition wall member.

* * * * *